(12) United States Patent
Shimada et al.

(10) Patent No.: US 10,632,702 B2
(45) Date of Patent: Apr. 28, 2020

(54) MOLDED PRODUCT PROCESSING SYSTEM

(71) Applicant: KIKUSUI SEISAKUSHO LTD., Kyoto-shi (JP)

(72) Inventors: Satoshi Shimada, Kyoto (JP); Tomohiro Kakitani, Kyoto (JP); Hiroshi Suzuki, Kyoto (JP); Hitoshi Kusunoki, Kyoto (JP); Satoru Watano, Sakai (JP)

(73) Assignee: KIKUSUI SEISAKUSHO LTD., Kyoto-Shi, Kyoto (JP)

( * ) Notice: Subject to any disclaimer, the term of this patent is extended or adjusted under 35 U.S.C. 154(b) by 71 days.

(21) Appl. No.: 16/129,927

(22) Filed: Sep. 13, 2018

(65) Prior Publication Data
US 2019/0105863 A1    Apr. 11, 2019

(30) Foreign Application Priority Data

Oct. 6, 2017   (JP) .................................. 2017-196329

(51) Int. Cl.
| | |
|---|---|
| *B29C 43/34* | (2006.01) |
| *B30B 11/10* | (2006.01) |
| *B30B 11/00* | (2006.01) |
| *B30B 15/26* | (2006.01) |
| *B30B 15/32* | (2006.01) |

(Continued)

(52) U.S. Cl.
CPC ............ *B30B 11/10* (2013.01); *B30B 11/005* (2013.01); *B30B 11/08* (2013.01); *B30B 15/0023* (2013.01); *B30B 15/022* (2013.01); *B30B 15/26* (2013.01); *B30B 15/302* (2013.01); *B30B 15/32* (2013.01); *B65G 47/846* (2013.01); *B29C 43/08* (2013.01)

(58) Field of Classification Search
CPC ................................ B29C 43/08; B30B 15/32
See application file for complete search history.

(56) References Cited

U.S. PATENT DOCUMENTS 2,946,298 A * 7/1960 Doepel ................... B30B 11/34
                                                    264/275
6,827,567 B2 * 12/2004 Kouda .................... B30B 11/08
                                                    29/623.1

(Continued)

FOREIGN PATENT DOCUMENTS

| EP | 1 489 024 A1 | 12/2004 |
|---|---|---|
| JP | 2017-164786 A | 9/2017 |

*Primary Examiner* — Joseph S Del Sole
*Assistant Examiner* — Thu Khanh T Nguyen
(74) *Attorney, Agent, or Firm* — McGinn IP Law Group, PLLC.

(57) ABSTRACT

A molded product processing system is configured to apply a post process to a molded product molded by a compression-molding machine. The system includes modules each including a conveying mechanism configured to convey a plurality of molded products P kept aligned, and a processing mechanism confronting a travel route of the molded products conveyed by the conveying mechanism and configured to apply a predetermined post process to each of the conveyed molded products, in which upstream one of the modules and downstream one of the modules are connected to allow the molded products having gone through certain processing at the upstream one of the modules to be delivered to the downstream one of the modules and be subjected to a different predetermined processing at one of the modules.

20 Claims, 17 Drawing Sheets

(51) Int. Cl.
*B30B 15/02* (2006.01)
*B30B 15/30* (2006.01)
*B30B 15/00* (2006.01)
*B30B 11/08* (2006.01)
*B65G 47/84* (2006.01)
*B29C 43/08* (2006.01)

(56) References Cited

U.S. PATENT DOCUMENTS

| | | | |
|---|---|---|---|
| 8,029,261 B2* | 10/2011 | Narasaki | B30B 7/04 |
| | | | 425/78 |
| 8,062,015 B2* | 11/2011 | Sanderson | B30B 11/08 |
| | | | 425/126.1 |
| 2005/0236255 A1 | 10/2005 | Minami et al. | |
| 2017/0151743 A1 | 6/2017 | Shimada et al. | |
| 2017/0266853 A1 | 9/2017 | Shimada et al. | |

* cited by examiner

MOLDED PRODUCT PROCESSING SYSTEM

BACKGROUND

There has been known a rotary compression-molding machine including a die table of a turret having die bores, an upper punch and a lower punch slidably retained above and below each of the die bores, and configured to horizontally rotate the die table and the punches together to compression mold (or make a tablet) a powdery material filled in the die bores when the paired upper and lower punches pass between an upper roll and a lower roll. The molding machine of this type is applied, for example, to produce pharmaceutical tablets, food products, electronic components, and the like.

Each molded product is subjected to various post processes. Examples of the post processes include inspecting the molded product as to whether or not the molded product has a defective exterior, removing dust adhering to the molded product, inspecting the molded product in terms of volume, weight, or components, inspecting as to whether or not the molded product contains any alien metal, printing or engraving on the exterior of the molded product, and wrapping the molded product. As disclosed in JP 2017-164786 A, there has recently been an attempt to continuously execute from molding a product to applying a post process by connecting the compression-molding machine with a downstream device or equipment configured to execute the post process.

The lower punches push upward products molded in the die bores of the compression-molding machine to become flush with an upper surface of the die table. The molded products are then caught by a guide member positioned to confront the upper surface of the die table, are guided to a gutter chute slanted downward, and fall along the gutter chute to be delivered to the device or the equipment configured to execute the post process. A device or an equipment configured to execute certain processing and another device or equipment configured to execute subsequent processing are ordinarily connected via a gutter chute for delivery of the molded products.

Such a technique obviously causes gradual decrease in height of the molded products and requires disposition of a lift configured to halfway lift upward the molded products. Furthermore, when the molded products drop onto the chute, the molded products may hit an inner wall or a bottom wall of the chute or may collide with each other to be damaged (e.g., broken, chipped, or abraded). In particular, molded products having less hardness such as orally disintegrating tablets (OD tablets that disintegrate by saliva or a small amount of water in an oral cavity) or chewable tablets (that are crunched in an oral cavity) are seriously damaged by dropping.

Furthermore, the molded products become not aligned in the order of molding by the compression-molding machine while being transported via the chute. Upon tableting failure such as sticking of the powdery material kept adhering to a specific one of the die bores or the punches of the compression-molding machine to cause a chipped molded product or mold trouble such as chipping at a tip of one of the punches, a normal molded product and a defective molded product are mixed to be indistinguishable from each other. A large number of molded products are thus entirely required to be discarded in this case.

SUMMARY OF THE INVENTION

The exemplary invention provides a molded product processing system suitable for application of an appropriate post process to a product molded by a compression-molding machine.

The exemplary invention provides a molded product processing system configured to apply a post process to a molded product molded by a compression-molding machine that includes a die table having a vertically penetrating die bore, and an upper punch and a lower punch vertically slidably retained above and below the die bore, and is configured to compress a powdery material filled in the die bore with use of the upper punch and the lower punch to mold the molded product. The molded product processing system includes modules each including a conveying mechanism configured to convey a plurality of molded products kept aligned in an order of molding by the molding machine, and a processing mechanism confronting a travel route of the molded products conveyed by the conveying mechanism and configured to apply a predetermined post process to each of the conveyed molded products, in which upstream one of the modules and downstream one of the modules are connected to allow the molded products having gone through certain processing at the upstream one of the modules to sequentially be delivered to the downstream one of the modules and be subjected to a different predetermined processing at the one of the modules.

A powdery material is an aggregate of minute solids and conceptually includes an aggregate of particles such as so-called granules and an aggregate of powder smaller than such particles.

The molded product processing system that is configured, as set forth above, allows the molded products to be conveyed while being kept aligned in the order of molding by the compression-molding machine. The molded products can accordingly be subjected to an appropriate post process by addition or removal of a module including an appropriate processing mechanism.

If each of the modules is accommodated in a containment case inhibiting an external leakage of an atmosphere in the containment case, and applies the post process to the molded products in the containment case, then the system achieves a containment environment with neither halfway discharge of the molded products from the system nor the external leakage of the atmosphere including the powdery material. The system is particularly useful for production of molded products containing a highly pharmacologically active substance. The system also inhibits contamination of the molded products.

The conveying mechanism included in the module substantially horizontally preferably shifts the plurality of molded products while being kept aligned. This inhibits as much as possible a vertical positional displacement of the molded products to reduce a risk of damage to the molded products dropped due to gravity force. Furthermore, this does not essentially require any lift configured to lift upward the molded products.

Specific examples of the processing mechanism included in the module include an exterior inspection mechanism that includes a camera and is configured to image each of the molded products, and configured to inspect the molded product in terms of an exterior condition, a dust removal mechanism configured to remove dust adhering to the molded product, a quality inspection mechanism configured to inspect the molded product in terms of volume, weight, or a component, a foreign matter detection mechanism configured to inspect the molded product as to whether or not the molded product contains any foreign matter, a printing mechanism configured to print or engrave on the exterior of the molded product, and a wrapping mechanism configured to wrap the molded product.

If the compression-molding machine includes a plurality of die bores, and a plurality of pairs of upper punches and lower punches, then the processing mechanism included in the module corresponds to an exterior inspection mechanism that includes a camera configured to image each of the molded products, and is configured to inspect the molded product in terms of an exterior condition, a quality inspection mechanism configured to inspect the molded product in terms of volume, weight, or a component, or a foreign matter detection mechanism configured to inspect the molded product as to whether or not the molded product contains any foreign matter, and a controller includes a storage device configured to store information on a result of an inspection of the molded product by the processing mechanism, in association with identification information on the die bore and the pair of upper and lower punches and used for molding the molded product, the molded product detected to have defectiveness through the inspection can be specified and tracked. This also enables quick specification of the die bore and the pair of punches used for molding such a defective product in the compression-molding machine.

If the module includes a removal mechanism configured to select to remove the molded product determined as being defective through an inspection by the processing mechanism, from the normal molded products, then the system enables removal of only a defective molded product without stopping the compression-molding machine or the molded product processing system to achieve improvement in yield of the molded products.

The exemplary invention may achieve the molded product processing system suitable for application of an appropriate post process to a product molded by the compression-molding machine.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF AN EXEMPLARY EMBODIMENT

Figure 1:
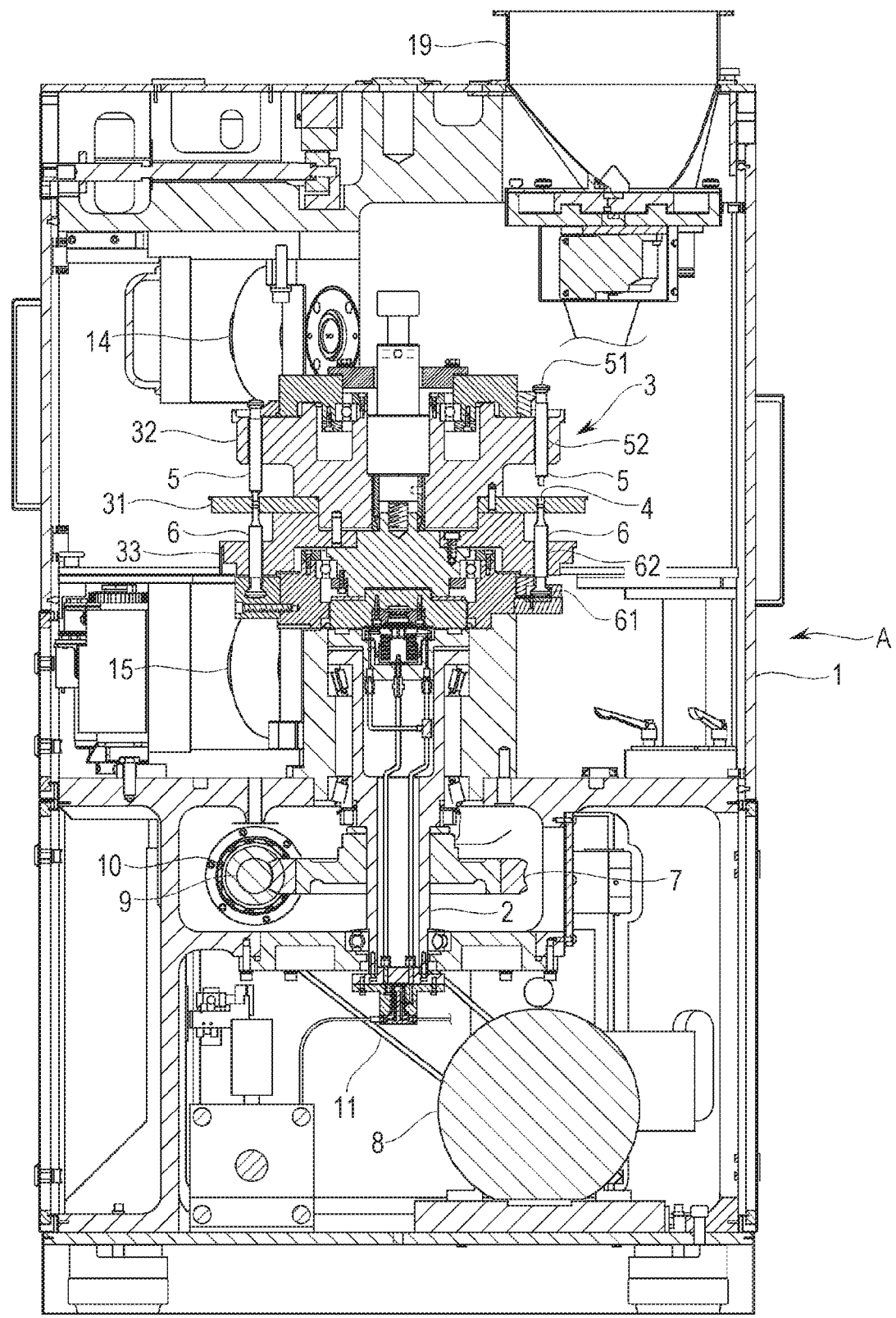
FIG. 1 is a side sectional view of a rotary compression-molding machine according to an exemplary embodiment of the exemplary invention.

An exemplary embodiment of the exemplary invention will now be described with reference to the drawings. Initially described is an overview of an entire rotary compression-molding machine (hereinafter, referred to as the "molding machine") A according to the exemplary embodiment. As shown exemplarily in FIG. 1, the molding machine A includes a frame 1 accommodating an upright shaft 2 functioning as a rotary shaft and a turret 3 attached to a connection portion that is disposed at a top of the upright shaft 2.

The turret 3 horizontally rotates about the upright shaft 2, and more specifically, spins. The turret 3 includes a die table (e.g., die disc) 31, an upper punch retaining portion 32, and a lower punch retaining portion 33. As shown exemplarily in FIG. 2, the die table 31 has a substantially circular disc shape in a planar view in a vertical direction, and has a plurality of die bores 4 that is disposed in an outer circumferential portion and is aligned in a rotation direction (e.g., a circumferential direction) at predetermined intervals. Each of the die bores 4 vertically penetrates the die table 31. The die table 31 is alternatively divided into a plurality of plates. Instead of the die bores 4 formed by directly drilling the die table 31, the die table 31 alternatively has a plurality of die members that is separate from the die table 31 and is detachably attached thereto. In this case, each of the die members has a die bore penetrating vertically.

The die bores 4 each have an upper punch 5 and a lower punch 6 disposed above and below the die bore 4, respectively. The upper punches 5 and the lower punches 6 are retained by the upper punch retaining portion 32 and the lower punch retaining portion 33, respectively, so as to be independently slidable vertically with respect to a corresponding one of the die bores 4. The upper punches 5 each have a tip 53 that enters and exits the corresponding one of the die bores 4. The lower punches 6 each have a tip 63 that is kept inserted in the corresponding one of the die bores 4. The upper punches 5 and the lower punches 6 horizontally rotate, and more specifically revolve, about the upright shaft 2 along with the turret 3 and the die bores 4.

The upright shaft 2 has a lower end to which a worm wheel 7 is attached. The worm wheel 7 meshes with a worm gear 10. The worm gear 10 is fixed to a gear shaft 9 that is driven by a motor 8. Drive power outputted from the motor 8 is transmitted to the gear shaft 9 via a belt 11, so as to drive to rotate the upright shaft 2 by way of the worm gear 10 and the worm wheel 7, and further to rotate the turret 3 and the punches 5 and 6.

Figure 2:
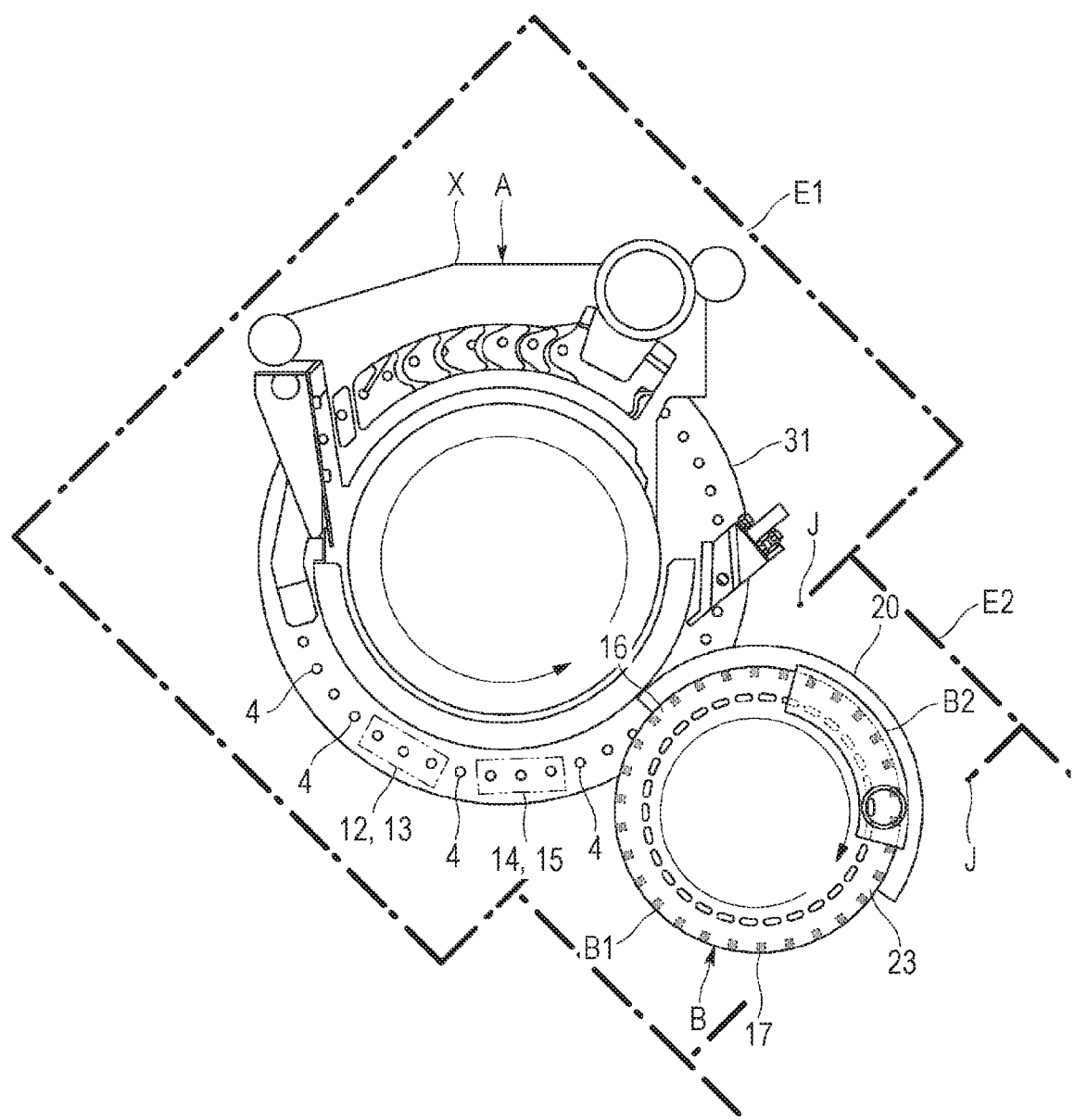
FIG. 2 is a plan view of a main part of the rotary compression-molding machine and a conveying mechanism according to the exemplary embodiment.

A powdery material as a raw material for a compression molded product P such as, for example, a pharmaceutical tablet is filled in the die bores 4 with use of a feeder X, as shown in FIG. 2. Examples of the feeder X include an agitated feeder and a gravity feeder, either one of which is applicable to the exemplary invention. The powdery material is fed to the feeder X by using a powdery-material feeding device. The powdery material is supplied to the powdery material feeding device with use of a hopper 19. The hopper 19 is detachably attached to the molding machine A.

Figure 3:
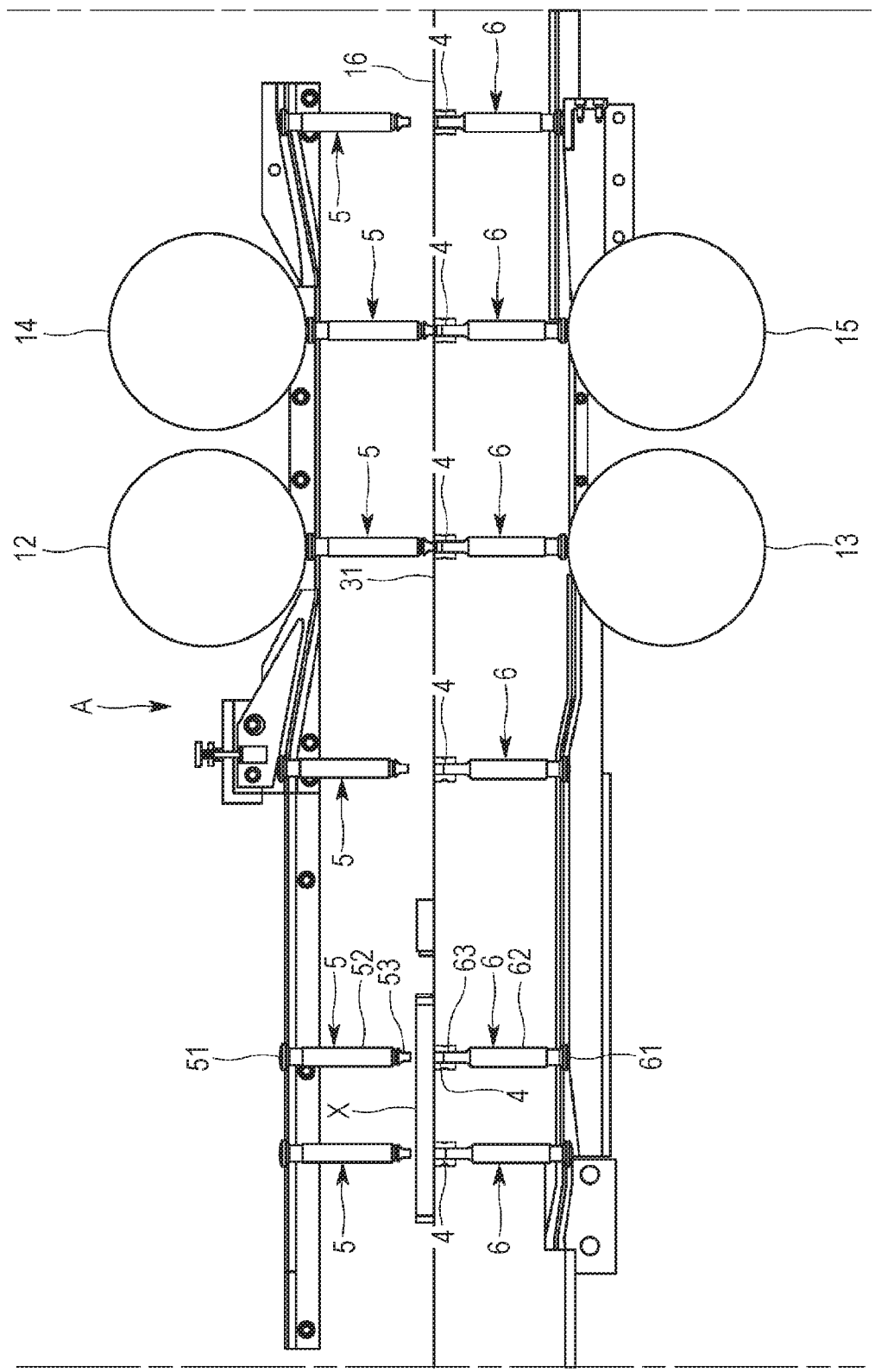
FIG. 3 is a cylindrical view of the rotary compression-molding machine according to the exemplary embodiment.

As shown exemplarily in FIGS. 2 and 3, a preliminary compression upper roll 12, a preliminary compression lower roll 13, a substantial compression upper roll 14, and a substantial compression lower roll 15 are disposed on orbits of the punches 5 and 6 that revolve about the upright shaft 2. The preliminary compression upper roll 12 and the preliminary compression lower roll 13 are paired to vertically sandwich the punches 5 and 6, and the substantial compression upper roll 14 and the substantial compression lower roll 15 are paired to vertically sandwich the punches 5 and 6, respectively. The preliminary compression upper roll 12 and the preliminary compression lower roll 13 as well as the substantial compression upper roll 14 and the substantial compression lower roll 15 bias the upper and lower punches 5 and 6 to bring the upper and lower punches 5 and 6 closer to each other, so that distal end surfaces of the tips 53 and 63 compress from above and below the powdery material filled in the die bores 4.

The upper and lower punches 5 and 6 have heads 51 and 61, respectively, pressed by the rolls 12, 13, 14, and 15, and trunks 52 and 62 smaller in diameter than the heads 51 and 61, respectively. The upper punch retaining portion 32 of the turret 3 vertically slidably retains the trunks 52 of the upper punches 5, whereas the lower punch retaining portion 33 vertically slidably retains the trunks 62 of the lower punches 6. The tips 53 and 63 as distal ends of the trunks 52 and 62 are thinner than the remaining parts and have diameters substantially equal to an inner diameter of the die bores 4 so as to be inserted to the die bores 4. The punches 5 and 6 revolve to cause the rolls 12, 13, 14, and 15 to come closer to the heads 51 and 61 of the punches 5 and 6, respectively. The rolls 12, 13, 14, and 15 come into contact with the heads 51 and 61 to step thereonto. The rolls 12, 13, 14, and 15 further press the upper punches 5 downward and press the lower punches 6 upward. While the rolls 12, 13, 14, and 15 are in contact with flat surfaces of the punches 5 and 6, the punches 5 and 6 keep applying constant pressure to the powdery material in the corresponding die bores 4.

There is a molded product discharge position 16 displaced ahead, in a rotation direction of the turret 3 and the punches 5 and 6, from a portion pressed by the substantial compression upper roll 14 and the substantial compression lower roll 15. Each of the lower punches 6 ascends until an upper end surface of the tip 63 of the lower punch 6 becomes substantially flush with an upper end of the die bore 4, or an upper surface of the die table 31 before reaching the molded product discharge position 16, and pushes the molded product P out of the die bore 4. The molded product P pushed out of the die bore 4 is transferred to a molded product processing system (hereinafter, referred to as the "processing system") S connected to the molding machine A at the molded product discharge position 16.

The molding machine A and (modules B, C, and D of) the processing system S according to the exemplary embodiment is controlled by a controller 0 examples of which include a microcomputer system, a personal computer, and a work station each including a processor, a main memory and an auxiliary storage device (e.g., a flash memory or a hard disk drive) as storage devices, an input/output interface, and the like, and a programmable controller. The controller 0 reads a program preliminarily stored in the auxiliary storage device to the processor by the memory, causes the processor to decode the program, and controls the molding machine A and the processing system S.

Figure 4:
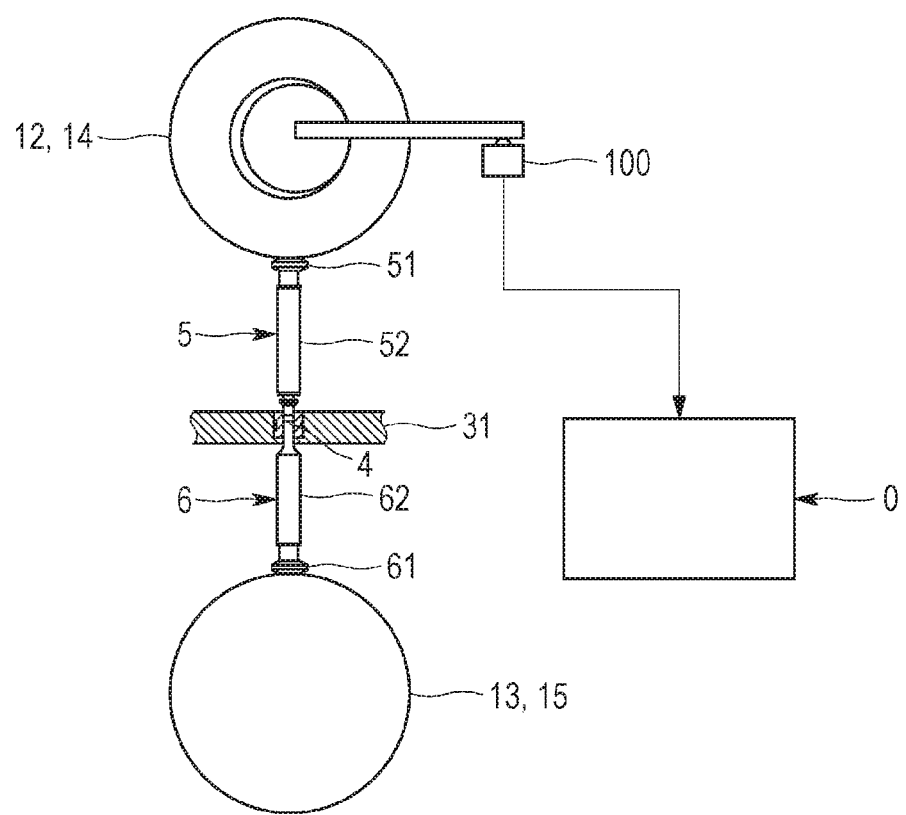
FIG. 4 is a configuration diagram of rolls and a load cell included in the rotary compression-molding machine according to the exemplary embodiment.
Figure 5:
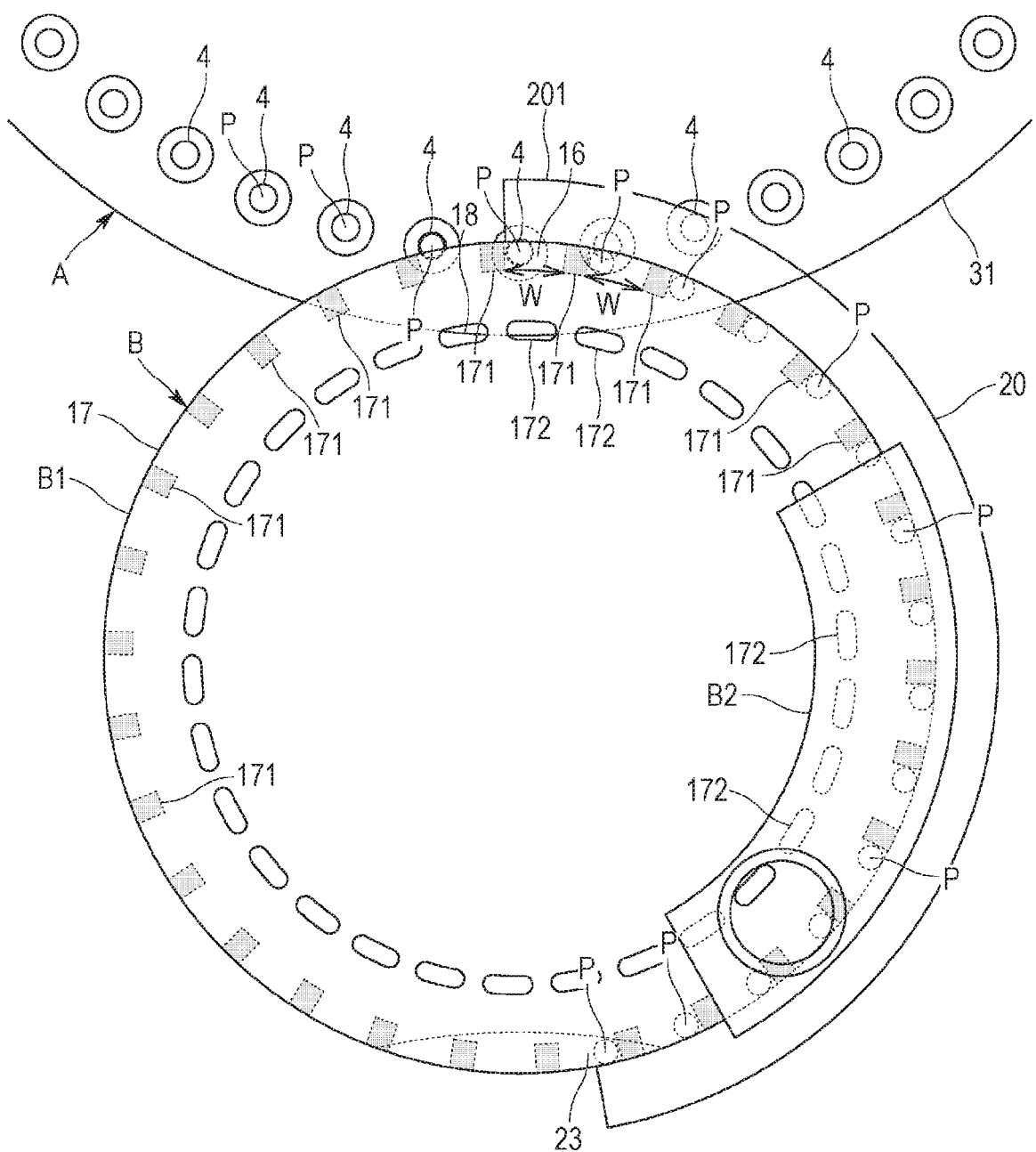
FIG. 5 is a plan view of the conveying mechanism according to the exemplary embodiment.

As shown exemplarily in FIG. 4, the upper rolls 12 and 14 of the molding machine A each have a load cell 100 configured to detect pressure applied to compress the powdery material in the die bore 4 by the rolls 12 to 15 via the punches 5 and 6. The controller 0 receives and refers to a signal transmitted from each of the load cells 100 disposed at the rolls 12 13, 14, and 15 to find a magnitude of pressure applied to compress the powdery material in the die bore 4 by the preliminarily compression rolls 12 and 13 (e.g., a preliminary compression pressure) and a magnitude of pressure applied to compress the powdery material in the die bore 4 by the substantial compression rolls 14 and 15 (e.g., a substantial compression pressure). Signals outputted from the load cells 100 form a pulse signal train having a peak when each of the pairs of punches 5 and 6 compresses the powdery material in a corresponding one of the die bores 4 with maximum pressure. The number of molded products Produced by the molding machine A per unit time can be found by counting a number of pulse trains.

The molded product P compression molded at compression pressure out of a predetermined appropriate range is regarded as being defective. Specifically, compression pressure measured by the load cell 100 exceeds the predetermined range when the powdery material filled in the die bore 4 is more than an appropriate amount. In contrast, the compression pressure measured by the load cell 100 is less than the predetermined range when the powdery material filled in the die bore 4 is less than the appropriate amount. In either one of the cases, the molded product P compression molded in this die bore 4 has weight, density, and hardness different from desired values and is highly possibly defective.

The molding machine A is equipped with an angular position sensor (e.g., a rotation angle sensor) such as a rotary encoder, configured to detect a rotation angle and a rotational speed of the turret 3. The controller 0 receives and refers to a signal outputted from the rotary encoder to find current positions of the large number of the die bores 4 and the large number of the pairs of the punches 5 and 6 aligned circumferentially around a rotary axis of the turret 3. When defectiveness of the molded product P is detected with reference to the signal outputted from the load cell 100, the current position of the die bore 4 accommodating this molded product P can be recognized and tracked. The controller 0 stores to hold in the storage device, information on a result of an inspection as to whether or not compression pressure applied to mold the molded product P is appropriate (a result of determination of whether the target molded product P is normal or defective) with use of the load cells 100, in association with identification information on the die bore 4 and the pair of punches 5 and 6 used for molding the target molded product P such as an ID number indicating a certain order number of the die bore 4 used for molding the target molded product P.

Figure 11:
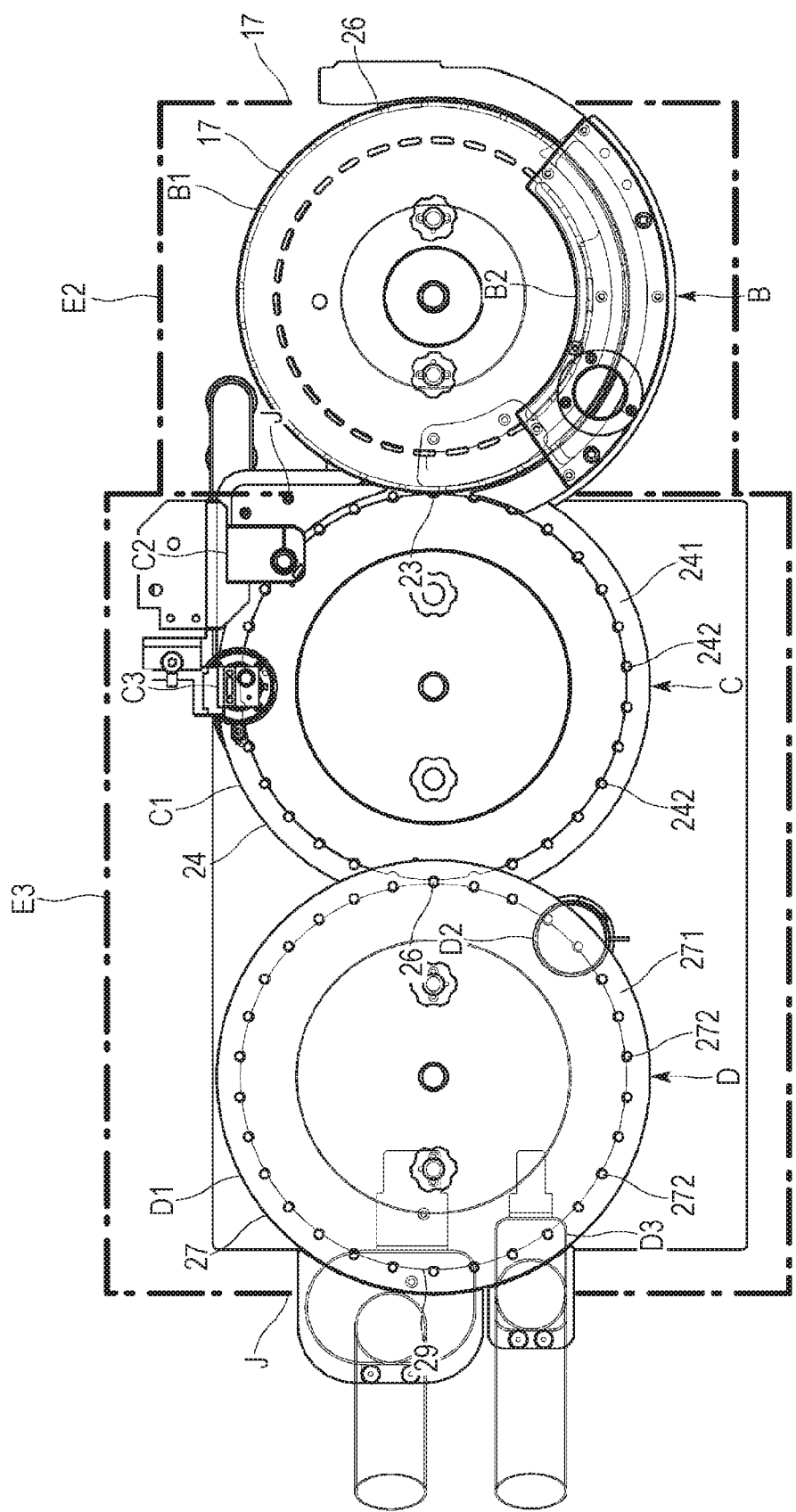
FIG. 11 is a plan view of a main part of the conveying mechanism according to the exemplary embodiment.

As shown exemplarily in FIGS. 2 and 11, the processing system S accompanying the molding machine A in the exemplary embodiment includes the plurality of disposed modules B, C, and D each configured to apply a certain post process to the molded products P. The modules B, C, and D include, respectively, conveying mechanisms B1, C1, and D1 configured to convey a plurality of molded products P kept aligned in the order of molding by the molding machine A, and processing mechanisms B2, B3, C2, C3, and D2 confronting a travel route of the molded products P conveyed by the conveying mechanisms B1, C1, and D1 and configured to apply a predetermined processing to each of the conveyed molded products P.

The conveying mechanisms B1, C1, and D1 include rotators 17, 24, and 27 configured to horizontally rotate in synchronization with one another, and engagement portions 171, 242, and 272 disposed to be spaced apart from each other at predetermined intervals along outer circumferential edges of the rotators 17, 24, and 27 (i.e., circumferentially around rotary axes of the rotators 17, 24, and 27, respectively). The engagement portions 171, 242, and 272 each engage with one of the molded products P to retain the molded product P and to prevent displacement relative to the rotators 17, 24, and 27. The molded products P engaged with the engagement portions 171, 242, and 272 travel along horizontal rotation loci due to rotation of the rotators 17, 24, and 27, respectively. In particular, the conveying mechanism B1 in the module B, located downstream of and directly connected to the molding machine A, functions as a discharge device configured to sequentially discharge the molded products P from the molding machine A while being kept aligned in the order of molding by the molding machine A. The conveying mechanism B1 in the module B will initially be described in detail.

The conveying mechanism B1 is configured to discharge, at the molded product discharge position 16, the molded products P by the molding machine A and convey the molded products P toward the processing mechanisms B2 and B3 each configured to apply a subsequent process to the molded products P. As shown exemplarily in FIGS. 5 to 8, the conveying mechanism B1 includes, as main constituent elements, the rotator 17 configured to horizontally rotate in synchronization with the die table 31 of the molding machine A, a retainer 18 disposed vertically below the rotator 17 and facing the rotator 17, a plurality of projections 171 extending downward toward the retainer 18 from a lower surface facing the retainer 18 in an outer circumferential portion of the rotator 17, an outer guide 20 disposed adjacent to the outer circumferential portion of the rotator 17 and closing, from outside, gaps between the adjacent projections 171, and an inner guide 21 disposed inside the outer circumferential portion of the rotator 17 and closing, from inside, the gaps between the adjacent projections 171.

The rotator 17 has a substantially circular disc shape in a planar view in a vertical direction. The plurality of projections 171 at the rotator 17 is disposed along an outer circumferential edge of the rotator 17 circumferentially around a rotary axis of the rotator 17, to be spaced apart from each other at predetermined intervals. These projections 171 obviously rotate integrally with the rotator 17. The molded products P by the molding machine A are each captured between adjacent projections 171 of the rotator 17 to be transferred while being accommodated in the gap between the adjacent projections 171. The projections 171 or the gaps between the adjacent projections 171 serve as engagement portions allowing engagement of the molded products P in the conveying mechanism B1.

The gaps between the projections 171 circumferentially adjacent to each other have a width W larger than the largest external size of the molded product P by the molding machine A. The largest external size corresponds to the longest one of line segments in a planar view, each extending from a certain point on an outer edge (i.e., an outline) of the molded product P to a different point on the outer edge of the molded product P through a gravity center or a geometrical center of the molded product P. In a case where the molded product P has an elliptical shape in a planar view, the largest external size corresponds to a major axis or a long diameter.

Figure 6:
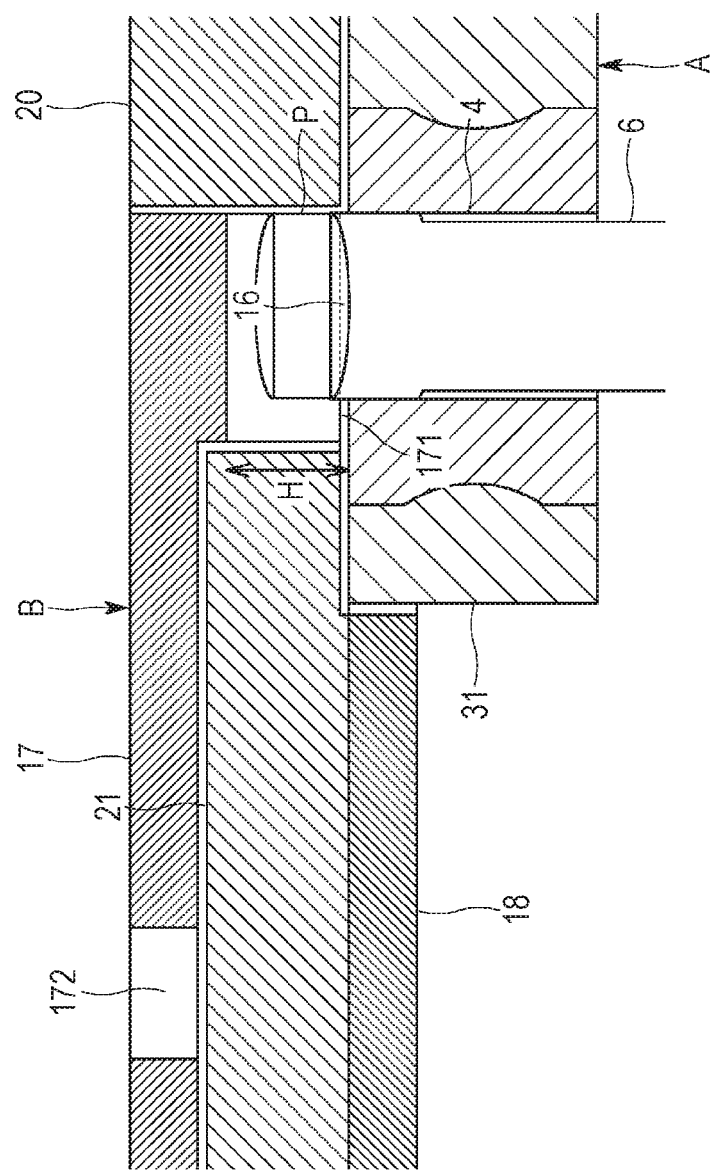
FIG. 6 is a longitudinal sectional view showing a main part of the conveying mechanism according to the exemplary embodiment.
Figure 7:
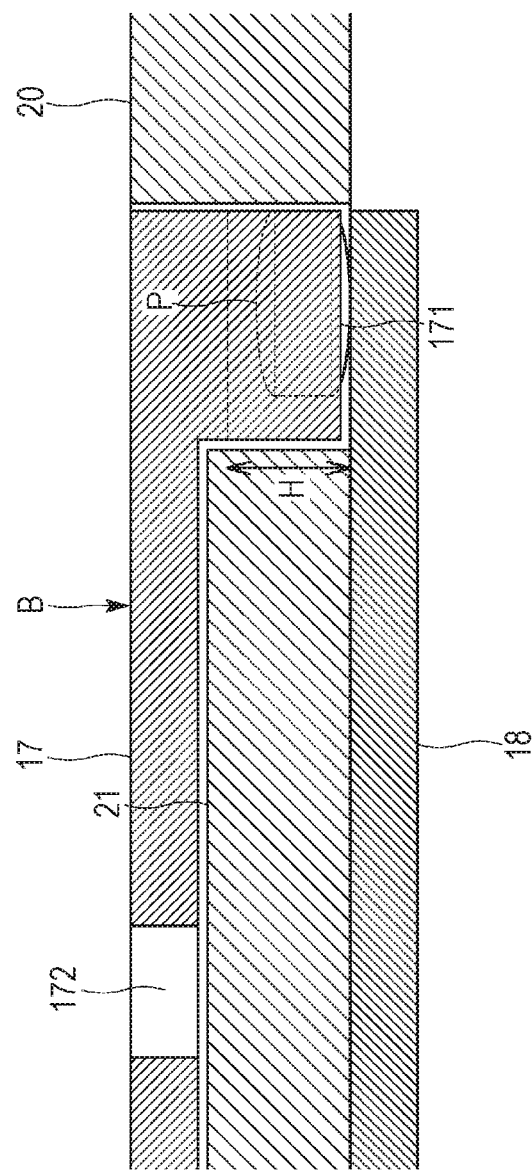
FIG. 7 is a longitudinal sectional view showing another main part of the conveying mechanism according to the exemplary embodiment.

As shown exemplarily in FIG. 6, the rotator 17 has a lower surface facing an upper surface of the retainer 18 with a predetermined vertical distance therebetween. The lower surface of the rotator 17 is positioned higher than the upper surface of the die table 31 of the molding machine A. The outer circumferential portion of the rotator 17 partially overlaps the die table 31 of the molding machine A from above. The projections 171 extending from the lower surface of the rotator 17 each have a distal end immediately adjacent to the upper surface of the retainer 18 and the upper surface of the die table 31. Synchronous rotation of the die table 31 and the rotator 17 temporarily overlaps each of the die bores 4 and the gap between the adjacent projections 171 at the molded product discharge position 16.

Unlike the rotator 17, the retainer 18 does not rotate and is disposed to overlap the outer circumferential portion of the rotator 17 from below. The retainer 18 is disposed adjacent to the die table 31 of the molding machine A and has the upper surface substantially flush with the upper surface of the die table 31. The molded product captured in the gap between the adjacent projections 171 of the rotator 17 slides or rolls on the upper surface of the retainer 18 while being horizontally rotating along with the projections 171. In other words, the retainer 18 supports the transferred molded product from below. In order to prevent interference with the die table 31, the retainer 18 has a part that corresponds to the molded product discharge position 16 where the die table 31 and the rotator 17 overlap each other in a planar view and is cut away in an arc shape along an outer circumferential edge of the die table 31. The part of the retainer 18 has an edge immediately adjacent to the outer circumferential edge of the die table 31 and allows the molded product P to smoothly shift from the upper surface of the die table 31 of the molding machine A onto the upper surface of the retainer 18 of the conveying mechanism B1.

The lower surface of the rotator 17 and the upper surface of the retainer 18 have a clearance H therebetween, which is substantially equal to or larger than vertical thickness of the molded product P by the molding machine A and is smaller than the smallest external size of the molded product P. The smallest external size corresponds to the shortest one of line segments in a planar view, each extending from a certain point on the outer edge of the molded product P to a different point on the outer edge of the molded product P through the gravity center or the geometrical center of the molded product P. In the case where the molded product P has an elliptical shape in a planar view, the smallest external size corresponds to a minor axis or a short diameter. The thickness of the molded product P is substantially equal to a vertical distance between the tip 53 of the upper punch 5 and the tip 63 of the lower punch 6 upon completion of compressing the powdery material filled in the die bore 4 in the molding machine A.

The outer guide 20 is disposed adjacent to the outer circumferential edge of the rotator 17 and expands to have a substantially arc shape surrounding the rotator 17 in a planar view. The guide 20 closes, from outside, the gaps positioned between the adjacent projections 171 and opened radially outward on the rotator 17, to inhibit the molded products from coming outward from the gaps due to centrifugal force. The outer guide 20 has a start edge 201 projecting toward the die table 31 of the molding machine A and overlapping the die table 31 from above to be positioned vertically above a horizontal rotation locus of the die bores 4. The outer guide 20 serves as a guide member configured to catch the molded products P pushed to the upper surface of the die table 31 of the molding machine A.

The inner guide 21 is disposed adjacent to radially inner edges of the projections 171 of the rotator 17, and expands to have, in a planar view, a substantially arc shape located inside the outer circumferential portion of the rotator 17. The guide 21 closes, from inside, the gaps opened radially inward on the rotator 17, to inhibit an unintended inward displacement of the molded products. The inner guide 21 is fixed to the retainer 18 or may be formed integrally with the retainer 18. The rotator 17 has a part facing an upper surface of the inner guide 21 and having a lower surface slightly recessed upward from lower surfaces facing the gaps (i.e., portions not having the projections 171) in the outer circumferential portion of the rotator 17. The upper surface of the inner guide 21 excluding an area equipped with a dust removal mechanism B2 to be described later is positioned slightly above the lower surfaces facing the gaps in the outer circumferential portion of the rotator 17. This prevents the molded products P from entering a space between the lower surface of the rotator 17 and the upper surface of the inner guide 21.

As described earlier, each of the lower punches 6 of the molding machine A ascends before reaching the molded product discharge position 16, to push the molded product P out of the die bore 4. The molded product P having been pushed out comes into contact with the outer guide 20 at the molded product discharge position 16 due to a rotation of the die table 31, and travels along the outer guide 20. The molded product P on the die table 31 then shifts onto the retainer 18. The molded product P is captured by the projections 171 extending downward from the rotator 17 and enters the gap between the adjacent projections 171 in a region between the rotator 17 and the retainer 18. The molded products P are each accommodated in one of the gaps. Thus, the gaps accommodate the molded products P one by one in the order of alignment of the die bores 4 in the die table 31 of the molding machine A (i.e., keeping the order of compression molding by the molding machine A). Furthermore, the molded products P will not be reversed vertically while being delivered from the die table 31 of the molding machine A to the rotator 17 of the conveying mechanism B1 in the module B.

Each of the molded products P captured in the gap between the adjacent projections 171 comes into contact with the projection 171 positioned behind in a rotation direction of the rotator 17 and is pushed by the projection 171 to slide or roll to be transferred on the retainer 18 along a rotation locus of the projection 171. Each of the molded products P accommodated in the gap is substantially constantly positioned relatively to the adjacent projections 171. The molded product P is displaced in the gap radially outward from a radially inner position on the rotator 17 because the rotating rotator 17 applies centrifugal force to the molded product P. The molded product P, however, comes into contact with an inner rim of the outer guide 20 to be prevented from being further displaced, so that the molded product P will not come outward from the gap. The rotator 17 closes the gaps from above, so that the molded product P captured in the gap will not suddenly bounce and come out of the gap.

The rotator 17 has communicating bores 172 each causing a corresponding one of the gaps between the adjacent projections 171 to be communicable with outside. The communicating bores 172 are positioned radially inside the gaps of the rotator 17 and vertically penetrate the rotator 17 as long bores extending circumferentially in the rotator 17. The communicating bores 172 are equal in the number to the gaps.

The dust removal mechanism B2, as one of the processing mechanisms in the module B, is equipped partially in the outer circumferential portion of the rotator 17. The dust removal mechanism B2 covers, from above, the communicating bores 172, the gaps between the adjacent projections 171, and a boundary between the rotator 17 and the outer guide 20, and expands circumferentially along the rotator 17. As shown exemplarily in FIG. 8, the dust removal mechanism B2 includes a spray nozzle 221 positioned vertically above the communicating bore 172 and configured to spray compressed air K downward toward the communicating bore 172, and a dust collecting duct 222 positioned vertically above the boundary between the rotator 17 and the outer guide 20 and configured to suck the air K upward. The compressed air K can be preliminarily ionized by a static eliminator, and can be sprayed in a pulsed manner.

The compressed air K fed from the spray nozzle 221 reaches the gap between the adjacent projections 171 through the space between the lower surface of the rotator 17 and the upper surface of the inner guide 21, and is sprayed to an exterior of the molded product P accommodated in the gap to blow off and to remove dust adhering to the exterior of the molded product P. The air K having hit the molded product P and containing dust leaks upward through a space between the rotator 17 and the outer guide 20 and is sucked into the dust collecting duct 222.

Figure 8:
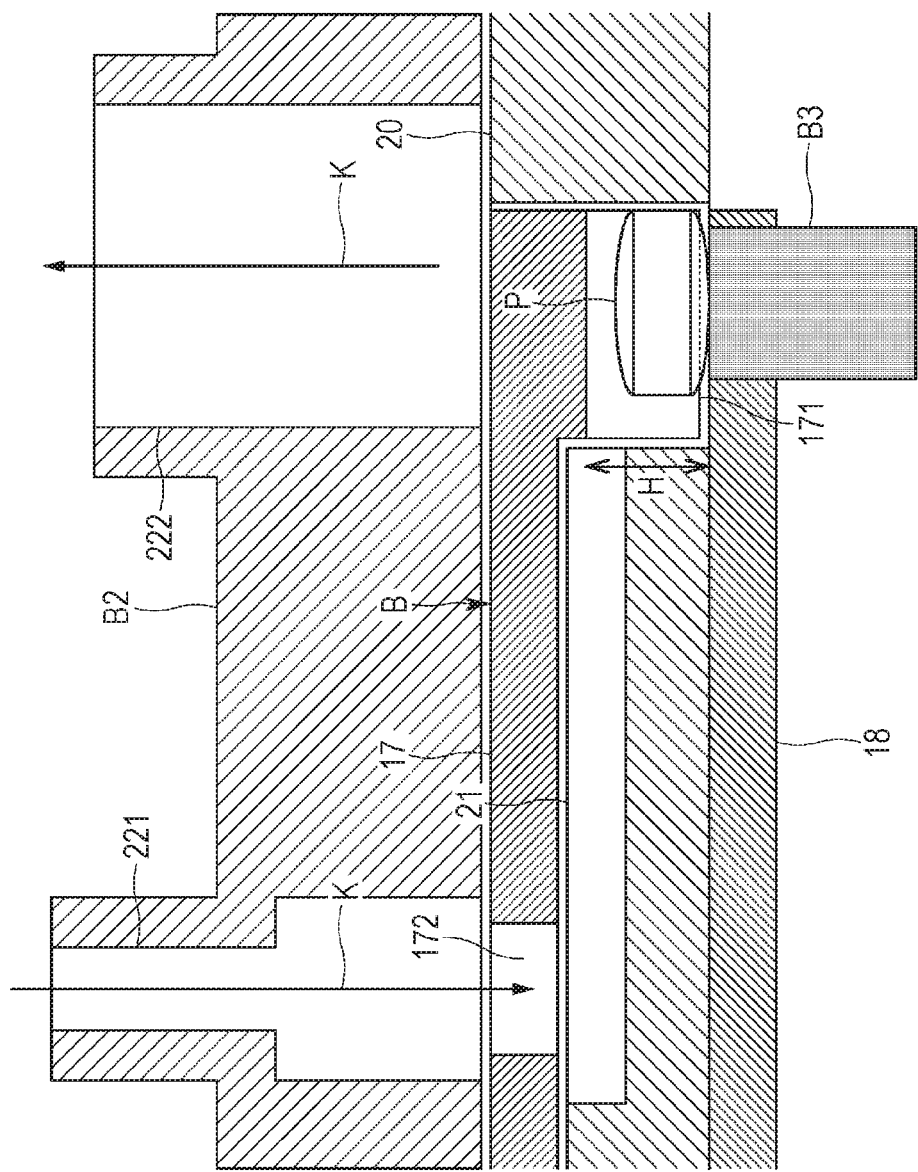
FIG. 8 is a longitudinal sectional view showing main parts of the conveying mechanism and a processing mechanism according to the exemplary embodiment.

As shown exemplarily in FIG. 8, the outer circumferential portion of the rotator 17 can optionally be equipped, in a predetermined area, with an exterior inspection mechanism B3 including a camera, as one of the processing mechanisms in the module B. The camera in the exterior inspection mechanism B3 is configured to image a predetermined surface such as, for example, a lower surface of each of the molded products P captured in the gap between the adjacent projections 171 and transferred, to obtain a picture thereof. The obtained picture can be used for an inspection of an exterior condition of the molded product P. Specifically, the obtained picture can be analyzed, be compared with a picture of a normal molded product P, or the like to enable determination of whether the exterior of the molded product P is in a normal or a defective condition.

The molded product P captured between the adjacent projections 171 of the rotator 17 is transferred to a transfer end position 23. The retainer 18 has a cut-away part positionally corresponding to the end position 23. The outer circumferential portion of the rotator 17 and the retainer 18 do not overlap each other in a planar view at the end position 23. The molded products P reaching the end position 23 are not supported by the retainer 18 from below and drop out of the gaps between the adjacent projections 171 to be delivered to the conveying mechanism C1 in the module C located downstream of and directly connected to the module B while keeping the order of alignment.

The exemplary embodiment provides a conveying mechanism B1 accompanying a molding machine A that includes a die table 31 having a vertically penetrating die bore 4, and an upper punch 5 and a lower punch 6 vertically slidably retained above and below the die bore 4, and is configured to compress a powdery material filled in the die bore 4 with use of the upper punch 5 and the lower punch 6 to mold a molded product P. The conveying mechanism B1 configured to transfer the molded product P discharged from the molding machine A.

The conveying mechanism B1 includes a rotator 17 configured to be horizontally rotatable, a retainer 18 facing the rotator 17 with a predetermined distance therebetween, a plurality of projections 171 extending toward the retainer 18 from a surface opposite to the retainer 18 in an outer circumferential portion of the rotator 17, aligned circumferentially around a rotary axis of the rotator 17 at an interval W larger than an external size of the molded product, and configured to capture the molded product, and a guide 20 disposed adjacent to the outer circumferential portion of the rotator 17 and closing a gap between the adjacent projections 171 from outside.

The molded product P by the molding machine A is captured by the projections 171 extending from the rotator 17. The molded product P is then accommodated in the gap between the adjacent projections 171 in the region between the rotator 17 and retainer 18 facing each other, and is transferred along the rotation locus of the projections 171. The discharge device according to the exemplary embodiment can discharge and transfer the molded products P varied in size or shape with use of the identical rotator 17.

The molding machine A includes a rotary molding machine configured to mold the molded product while horizontally rotating the die table 31, the upper punch 5, and the lower punch 6 along with one another, and the outer guide 20 has a start edge disposed to overlap the die table 31 from above and positioned vertically above a horizontal rotation locus of the die bore 4, and the guide catches the molded product P pushed upward to an upper surface of the die table 31 by the lower punch 6 and guides the molded product P to the gap between the projections 171. The products P sequentially molded by the molding machine A can thus be accommodated in the gaps one by one to be transferred in the order of molding.

The rotator 17 and the retainer 18 have a clearance H therebetween set to be substantially equal to or larger than thickness of the molded product P and smaller than the external size of the molded product P. The molded product P can thus be prevented from being reversed or rolling over during transfer.

Furthermore, the discharge device further includes a guide 21 closing, from inside, the gap between the adjacent projections 171 of the rotator 17. The molded product P is thus inhibited from being unintendedly displaced radially inward with respect to the rotator 17.

The rotator 17 has a communicating bore 172 causing the gap between the adjacent projections 171 to be communicable with outside and configured to import an air flow K blowing off dust entering the gap or dust adhering to the molded product P captured in the gap. Dust adhering to the molded product P can thus be removed in the transfer process.

The conveying mechanism B1 further includes a camera B3 positioned to confront a horizontal rotation locus of the projections 171 and configured to image the molded product P captured in the gap between the adjacent projections 171. The conveying mechanism B1 thus enables an inspection of an exterior of the molded product P.

In a case where the discharge device is configured to cause the molded products P by the molding machine A to drop onto a slanted gutter chute to collect the molded products P in a container or the like, the molded products P cannot be kept in the order or in vertical orientation and a large number of molded products P will inevitably be mixed. The conveying mechanism B1 according to the exemplary embodiment is configured to discharge the plurality of molded products P from the molding machine A one by one in the order of the aligned die bores 4 in the molding machine A, or in the order of molding of the molded products P, and accommodate the molded products P in the gaps while keeping the order of alignment. The conveying mechanism B1 is configured to transfer the molded products P from the molded product discharge position 16 to the end position 23 while the molded products P are kept in the order of production by the molding machine A. Furthermore, the molded products P will not be reversed vertically in the transfer process.

The conveying mechanism B1 is configured to horizontally convey the molded products P kept substantially flush with the upper surface of the die table 31 of the molding machine A. A chute obviously causes the molded products P to fall therealong. The molded products P thus need to be raised in height to be delivered to a device or an equipment configured to apply a subsequent process to the molded products P. The conveying mechanism B1 according to the exemplary embodiment does not require such a process. The discharge device B further eliminates a risk of damage to the falling molded product P due to collision with an inner wall of the chute, the container, or the like, or the molded products P already reserved in the container or the like.

The gaps between the adjacent projections 171 are large in size for accommodation of the molded products, and thus will require no strict positional accuracy upon delivery of the molded products P from the die table of the molding machine A to the rotator 17 of the conveying mechanism B1. The molded products P can be discharged and transferred appropriately even without significantly high positional accuracy of the conveying mechanism B1 to be installed to the molding machine A.

In a case where the molding machine A has a change in the number of the die bores 4 and the pairs of upper and lower punches 5 and 6 of the turret 3, the conveying mechanism B1 becomes applicable through replacement of the rotator 17 (with another rotator having the projections 171 and the gaps corresponding in the numbers to the die bores 4 and the punches 5 and 6) and/or adjustment of a relative rotational speed of the rotator 17 of the conveying mechanism B1 to the turret 3 of the molding machine A.

In order to synchronize rotation between the turret 3 of the molding machine A and the rotator 17 of the conveying mechanism B1, the conveying mechanism B1 can include a servo motor or a stepping motor as a motor configured to rotate the rotator 17, and an angular position sensor such as a rotary encoder configured to detect a rotation angle and a rotational speed of the turret 3, to achieve feedback control of the rotational speed of the motor configured to rotate the rotator 17 for synchronized rotation between the turret 3 and the rotator 17. The turret 3 and the rotator 17 are alternatively mechanically connected to interlock via a gear transmission mechanism, a winding transmission mechanism, or the like. The conveying mechanism B1 according to the exemplary embodiment is thus applicable to molding machines A varied in type, specification, and dimension.

The die table 31 of the molding machine A and the rotator 17 of the conveying mechanism B1 in the module B rotate in synchronization with each other. The controller 0 refers to a signal outputted from the angular position sensor attached to the turret 3 of the molding machine A or the rotator 17 of the conveying mechanism B1 to find current positions of the gaps between the adjacent projections 171 aligned circumferentially around the rotary axis of the rotator 17. Furthermore, it is possible to find a current position in the module B, of the molded product P compression molded in the die bore 4 having a certain order number in the die table 31 of the molding machine A. This indicates that the molded product P having passed in front of the camera of the exterior inspection mechanism B3 or having gone through the exterior inspection is molded in the die bore 4 having a certain order number. The controller 0 stores to hold in the storage device, information on a result of the exterior inspection of the molded product P (i.e., a result of determination of whether the exterior of the target molded product P is in a normal or a defective condition) with use of the exterior inspection mechanism B3, in association with an ID number indicating a certain order number of the die bore 4 used for molding the target molded product P.

A so-called containment machine has difficulty in discharging to observe the molded product P as needed. The conveying mechanism B1 disposed in the containment machine enables imaging by the camera B3 disposed at a predetermined position on a convey route without discharging the molded product P out of the system. The exterior of the molded product can thus be inspected without stopping production of the molded products P by the molding machine A and transfer of the molded products P by the conveying mechanism B1. The containment machine also achieves observation of the molded product in a production process (while production is continued without stopping tableting) by installing an exterior inspection mechanism.

The molded products P kept in the order of alignment by being captured respectively in the gaps in the transfer process are each associated with the die bore 4 and the pair of the punches 5 and 6 used for molding the molded product P. It is thus possible to quickly specify the die bore 4 or the punch 5 or 6 in trouble upon detection, through the exterior inspection of the molded product P, tableting failure such as sticking of the powdery material to the die bore 4 or the punch 5 or 6 to cause a chipped molded product or mold trouble such as chipping of the tip 53 or 63 of the punch 5 or 6. Only such a defective molded product P can be discarded with no necessity for wasting normal molded products P to achieve improvement in yield.

Each of the molded products P accommodated in the gap between the adjacent projections 171 is conveyed in the rotation direction of the rotator 17 while being pushed by the projection 171 positioned therebehind. The molded product P accommodated in each of the gaps is constantly positioned relatively to the adjacent projections 171 and the gap. This is effectual for processing of an exterior inspection through imaging the molded product P with use of the camera B3, processing of spraying compressed air toward the molded product P accommodated in specific one of the gaps to remove or extract the molded product, and the like.

The conveying mechanism B1 according to the exemplary embodiment does not need a process of aligning the molded products P in a device or an equipment configured to execute a subsequent process. There is needed no mechanism for aligning the molded products P, so that reduction in size of the entire device is achieved due to unnecessity for the mechanism.

The molded products P are not reversed vertically in the transfer process, and thus require neither determination nor alignment of a vertical orientation of each of the molded products P prior to import to a subsequent device or equipment such as a printer configured to print on the molded products P. Furthermore, in a case where the subsequent device or equipment is configured to suck the molded products P for conveyance, the molded products P aligned in the vertical orientation can be sucked easily. The molded products P may have a large parting line or engraving on one of the surfaces and be difficult to be sucked on the surface. The molded products P will be difficult to be sucked if the conveyed molded products P are not aligned in the vertical orientation. The conveying mechanism B1 according to the exemplary embodiment does not have such difficulty.

The conveying mechanism B1 is further configured to suck dust during conveyance, so that each of the molded products P can reliably receive the sucking air flow K for effective removal of dust.

Figure 9:
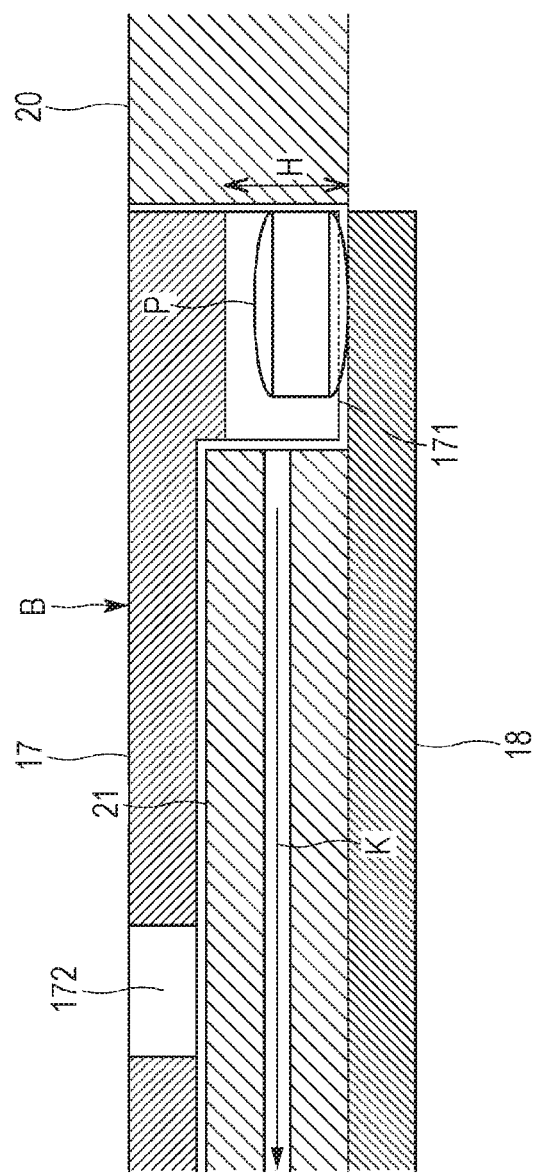
FIG. 9 is a longitudinal sectional view showing a main part of the conveying mechanism according to the exemplary embodiment.

As shown exemplarily in FIG. 9, the retainer 18 can have the communicating bore 172 for dust removal causing a corresponding one of the gaps between the adjacent projections 171 to be communicable with outside. The dust removal mechanism B2 configured to suck the air K in the gap between the adjacent projections 171 or to deliver the compressed air K into the gap through the communicating bore 172, to blow off dust entering the gap or dust adhering to the molded product P captured in the gap.

Figure 10:
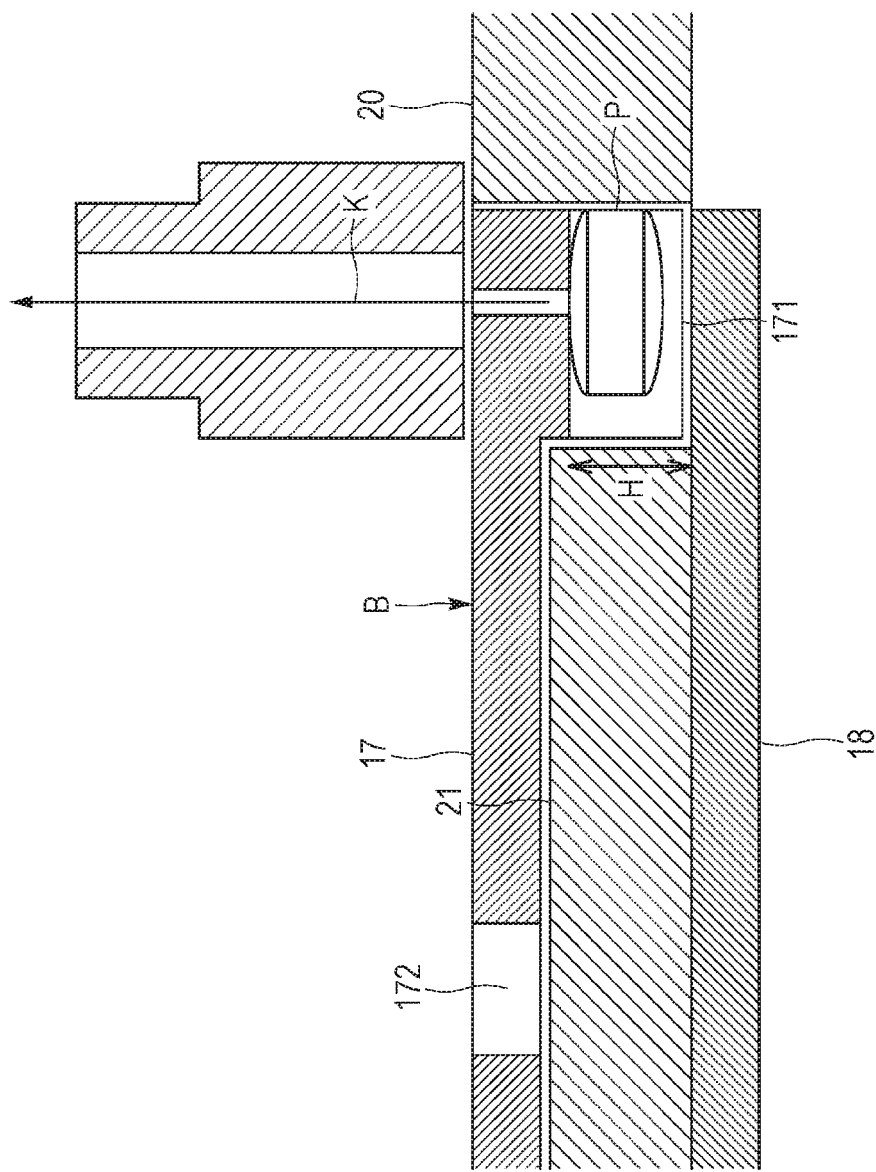
FIG. 10 is a longitudinal sectional view showing another main part of the conveying mechanism according to the exemplary embodiment.

As shown exemplarily in FIG. 10, the air K in the gap between the adjacent projections 171 can be sucked to generate negative pressure and allow the molded product P accommodated in the gap to be sucked to the rotator 17 and to float above the upper surface of the retainer 18. It is possible to achieve reduction in distance or time of sliding or rolling of the molded product P on the retainer 18 in the transfer process. This inhibits abrasion of the molded products P. In a case where the powdery material for the molded products P includes hard particles, the molded products P slide on the retainer 18 to possibly abrade the retainer 18 and generate dust that may stain the molded products P. The molded products P sucked to the rotator 17 will have no risk of such stain.

The conveying mechanism C1 in the module C connected behind the module B receives the molded products P at the end position 23 of conveyance by the conveying mechanism B1 in the module B, and conveys the molded products P to the processing mechanisms C2 and C3 each configured to apply a subsequent process to the molded products P. As shown exemplarily in FIGS. 11 and 12, the conveying mechanism C1 includes, as a main constituent element, the rotator 24 configured to horizontally rotate in synchronization with the rotator 17 of the conveying mechanism B1.

The rotator 24 has a substantially circular disc shape in a planar view in the vertical direction, and a flange 241 extending along the outer circumferential edge of the rotator 24 and expanding radially outward from the rotator 24. The flange 241 can include two circular disc plates differentiated in size and overlapped to be firmly coupled with each other (the circular disc plate having a smaller outer diameter is disposed on the circular disc plate having a larger outer diameter). A plurality of recessed bores 242 is disposed in an upper surface of the flange 241, in an outer cylindrical surface of the rotator 24 rising from the upper surface of the flange 241, or across the upper surface of the flange 241 and the outer cylindrical surface of the rotator 24. The recessed bores 242 are disposed along the outer circumferential edge of the rotator 24 circumferentially around a rotary axis of the rotator 24, to be spaced apart from each other at predetermined intervals. These recessed bores 242 obviously rotate integrally with the rotator 24. Each of the molded products P, delivered from the conveying mechanism B1 in the module B, is transferred while being engaged in the recessed bore 242 of the rotator 24 and captured in the recessed bore 242. The recessed bores 242 serve as the engagement portions allowing engagement of the molded products P in the conveying mechanism C1.

Figure 12:
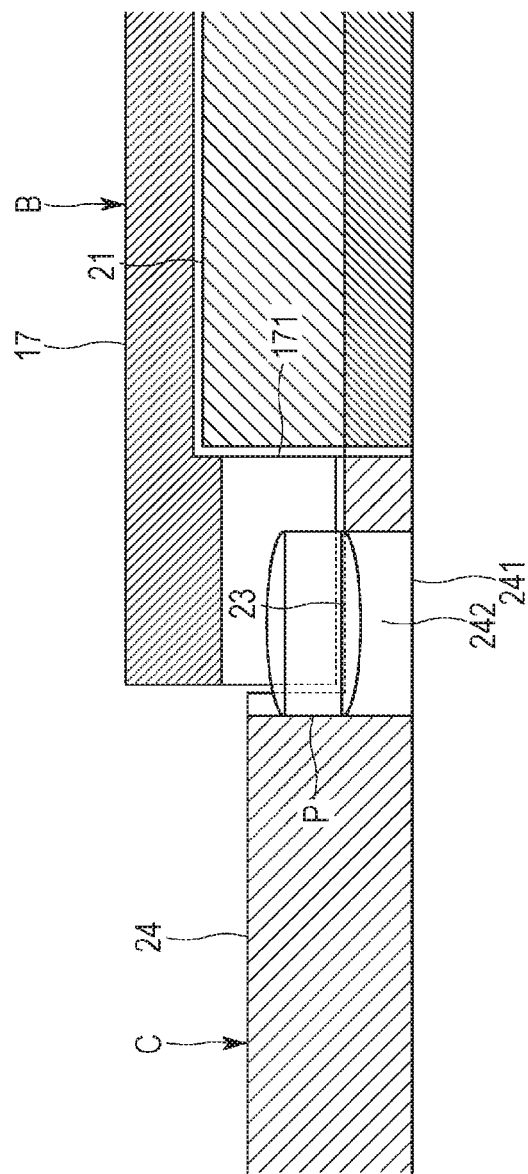
FIG. 12 is a longitudinal sectional view showing a main part of the conveying mechanism according to the exemplary embodiment.

As shown exemplarily in FIG. 12, the upper surface of the flange 241 in an outer circumferential portion of the rotator 24 in the conveying mechanism C1 is positioned below the lower surface of the rotator 17 and is substantially flush with the upper surface of the rotator 18 in the conveying mechanism B1 in the module B. The flange 241 of the rotator 24 partially overlaps the rotator 17 from below. The distal ends of the projections 171 extending from the lower surface of the rotator 17 are immediately adjacent to the upper surface of the retainer 18 and the upper surface of the flange 241. Synchronous rotation between the rotator 17 and the rotator 24 causes each of the gaps between the adjacent projections 171 and a corresponding one of the recessed bores 242 to temporarily overlap each other at the end position 23.

In order to prevent interference with the flange 241 of the rotator 24, the part of the retainer 18, corresponding to the end position 23 where the flange 241 and the rotator 17 overlap each other in a planar view, is cut away in an arc shape along an outer circumferential edge of the flange 241. The part of the retainer 18 has an edge immediately adjacent to the outer circumferential edge of the flange 241 and allows the molded product P to smoothly shift from the upper surface of the retainer 18 in the conveying mechanism B1 to the upper surface of the flange 241 of the rotator 24 in the conveying mechanism C1.

At the end position 23, the molded product P accommodated in the gap between the adjacent projections 171 of the rotator 17 and being transferred by being pushed by the projection 171 shifts from on the rotator 18 onto the flange 241 of the rotator 24 due to rotation of the rotator 17. The molded product P is captured in the recessed bore 242 in the rotator 24 and enters the recessed bore 242 to be engaged therein. The molded products P are each accommodated in one of the recessed bores 242. The recessed bores 242 thus engage with the molded products P one by one in the order of alignment of the gaps between the adjacent projections 171 of the rotator 17 in the conveying mechanism B1 (i.e., keeping the order of compression molding by the molding machine A). The molded products P will not be reversed vertically while being delivered from the rotator 17 of the conveying mechanism B1 to the rotator 24 of the conveying mechanism C1.

The molded products captured in the recessed bores 242 are transferred along a rotation locus of the recessed bores 242 due to rotation of the rotator 24. Each of the molded products P accommodated in the recessed bore 242 is substantially constantly positioned relatively to the rotator 24 and the recessed bore 242. The molded product P receives centrifugal force due to a rotation of the rotator 24, but engages in the recessed bore 242 so as not to be displaced outward. Furthermore, the molded products P will not be reversed vertically in the transfer process.

The molded products P can alternatively be sucked to the rotator 24 by negative pressure generated through sucking air in the recessed bores 242.

Figure 13:
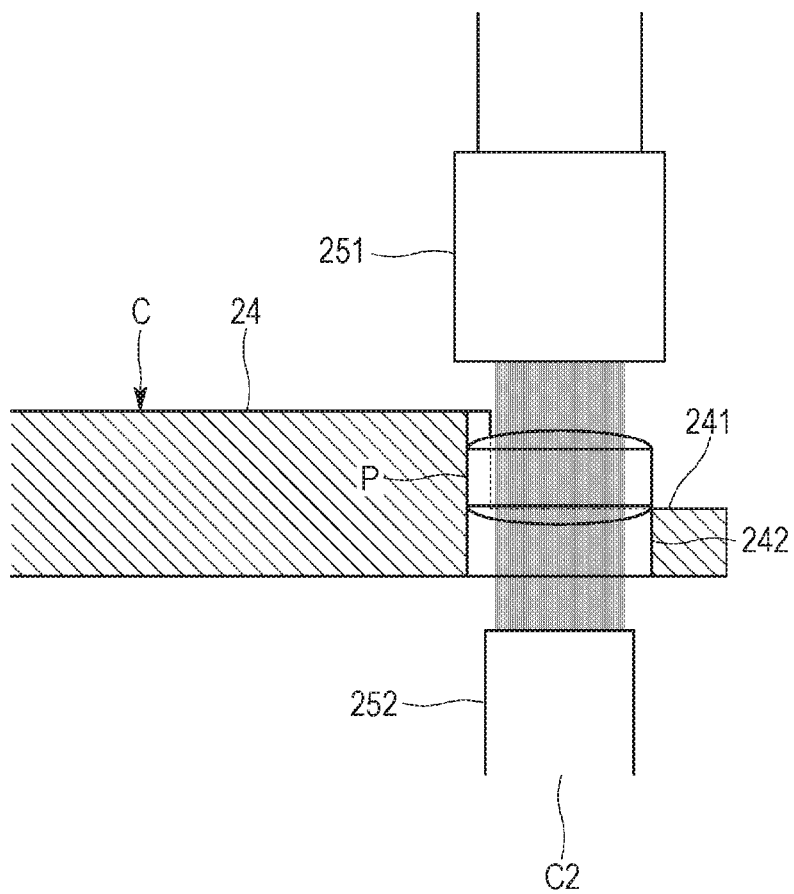
FIG. 13 is a longitudinal sectional view showing main parts of the conveying mechanism and the processing mechanism according to the exemplary embodiment.

As shown exemplarily in FIGS. 11 and 13, the rotator 24 has a predetermined area in the outer circumferential portion, equipped with a foreign matter detection mechanism C2 as one of the processing mechanisms in the module C. The foreign matter detection mechanism C2 includes, as constituent elements, a light source 251 positioned to overlap a travel locus of the molded products P conveyed by the conveying mechanism C1 in a planar view, and a light receiving sensor 252 for spectroscopic analysis. The light source 251 and the sensor 252 are disposed to vertically face each other with the molded product P interposed therebetween. The light source 251 emits light that is partially transmitted through the molded product P to be incident on the sensor 252 configured to analyze the transmitted light to find whether or not the molded product P contains any foreign matter.

The recessed bore 242, capturing each of the molded products P vertically, penetrates the flange 241 of the rotator 24, and first one of the light source 251 and the sensor 252 is positioned vertically above the flange 241, whereas second one thereof is positioned vertically below the flange 241. The rotator 24 and the flange 241 of the foreign matter detection mechanism C2 thus shield stray light other than signal light transmitted through the molded products P to inhibit incidence of the stray light to the sensor 252.

Figure 14:
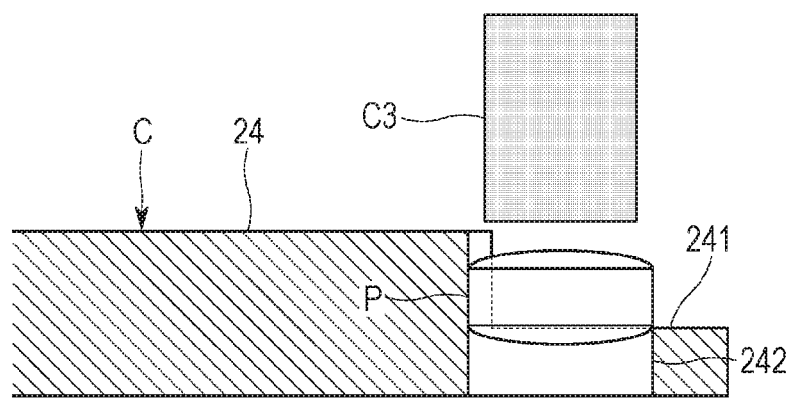
FIG. 14 is a longitudinal sectional view showing other main parts of the conveying mechanism and the processing mechanism according to the exemplary embodiment.

As shown exemplarily in FIGS. 11 and 14, the outer circumferential portion of the rotator 24 can optionally be equipped, in a predetermined area, with an exterior inspection mechanism C3 including a camera, as one of the processing mechanisms in the module C. The camera in the exterior inspection mechanism C3 is configured to image a predetermined surface, such as, for example, an upper surface of each of the molded products P captured in the recessed bore 242 and transferred, to obtain a picture thereof. The obtained picture can be used for the inspection of the exterior condition of the molded product P. Specifically, the obtained picture can be analyzed, be compared with a picture of a normal molded product P, or the like to enable determination of whether the exterior of the molded product P is in a normal or a defective condition.

The camera in the exterior inspection mechanism C3 can be configured to image the upper surface of the molded product P as well as the lower surface of the molded product P. Pictures of the upper surface and the lower surface of the molded product P can be analyzed to obtain a width, a length, a diameter, and an area, and the like of the molded product P. A side surface of the molded product P can optionally be imaged for determination of whether the molded product P is in a normal or a defective condition. The picture of the side surface of the molded product P can be analyzed to obtain a height (thickness) of the molded product P. The exterior inspection mechanism C3, functioning as a three-dimensional measurement device adopting an optical cutting method, is configured to obtain three-dimensional data on the molded product P, and the obtained data can be analyzed for determination of whether the exterior of the molded product P is in a normal or a defective condition. The exterior inspection mechanism C3 can be configured to execute either one of these processes, or can be configured to execute some of the processes in combination.

The die table 31 of the molding machine A, the rotator 17 of the conveying mechanism B1 in the module B, and the rotator 24 of the conveying mechanism C1 in the module C rotate in synchronization with one another. The controller 0 refers to a signal outputted from an angular position sensor (e.g., a rotary encoder) attached to the turret 3 of the molding machine A, the rotator 17 of the conveying mechanism B1, or the rotator 24 of the conveying mechanism C1 to find current positions of the recessed bores 242 aligned circumferentially around the rotary axis of the rotator 24. Furthermore, it is possible to find a current position in the module C, of the molded product P compression molded in the die bore 4 having a certain order number in the die table 31 of the molding machine A. This indicates that the molded product P having passed in front of the light receiving sensor 252 of the foreign matter detection mechanism C2 or the camera of the exterior inspection mechanism C3, or having gone through foreign matter inspection or exterior inspection is molded in the die bore 4 having a certain order number. The controller 0 stores to hold in the storage device, information on a result of an exterior inspection of the molded product P (i.e., a result of determination of whether or not the target molded product P contains any foreign matter or whether the exterior of the target molded product P is in an normal or a defective condition) with use of the foreign matter detection mechanism C2 or the exterior inspection mechanism C3, in association with an ID number indicating a certain order number of the die bore 4 used for molding the target molded product P.

The molded product P engaged in the recessed bore 242 is conveyed in a rotation direction of the rotator 24 while being constantly positioned relatively to the rotator 24 and the recessed bore 242. This is effectual for processing of analyzing transmitted light of light applied to the molded product P, processing of imaging the molded product P with use of the camera C3 for an exterior inspection, and the like.

The molded product P captured in the recessed bore 242 of the rotator 24 is transferred to a transfer end position 26. The molded product P reaching the end position 26 is delivered from the conveying mechanism C1 in the module C to the conveying mechanism D1 in the module D located downstream of and directly connected to the module C.

The conveying mechanism D1 in the module D, connected behind the module C, receives the molded products P at the end position 26 of conveyance by the conveying mechanism C1 in the module C, and conveys the molded products P to the processing mechanism D2 configured to apply a subsequent process to the molded products P. As shown exemplarily in FIGS. 11 and 15, the conveying mechanism D1 includes, as a main constituent element, the rotator 27 configured to horizontally rotate in synchronization with the rotator 24 of the conveying mechanism C1.

The rotator 27 has a substantially circular disc shape in a planar view in the vertical direction, and a flange 271 extending along the outer circumferential edge of the rotator 27 and expanding radially outward from the rotator 27. The flange 271 can include two circular disc plates differentiated in size and overlapped to be firmly coupled with each other (the circular disc plate having a larger outer diameter is disposed on the circular disc plate having a smaller outer diameter). A plurality of recessed bores 272 is disposed in a lower surface of the flange 271, in an outer cylindrical surface of the rotator 27 extending vertically downward from the lower surface of the flange 271, or across the lower surface of the flange 271 and the outer cylindrical surface of the rotator 27. The recessed bores 272 are disposed along the outer circumferential edge of the rotator 27 circumferentially around the rotary axis of the rotator 27, to be spaced apart from each other at predetermined intervals. These recessed bores 272 obviously rotate integrally with the rotator 27. Each of the molded products P delivered from the conveying mechanism C1 in the module C is transferred while being engaged in the recessed bore 272 of the rotator 27 and captured in the recessed bore 272. The recessed bores 272 serve as engagement portions allowing engagement of the molded products P in the conveying mechanism D1.

Figure 15:
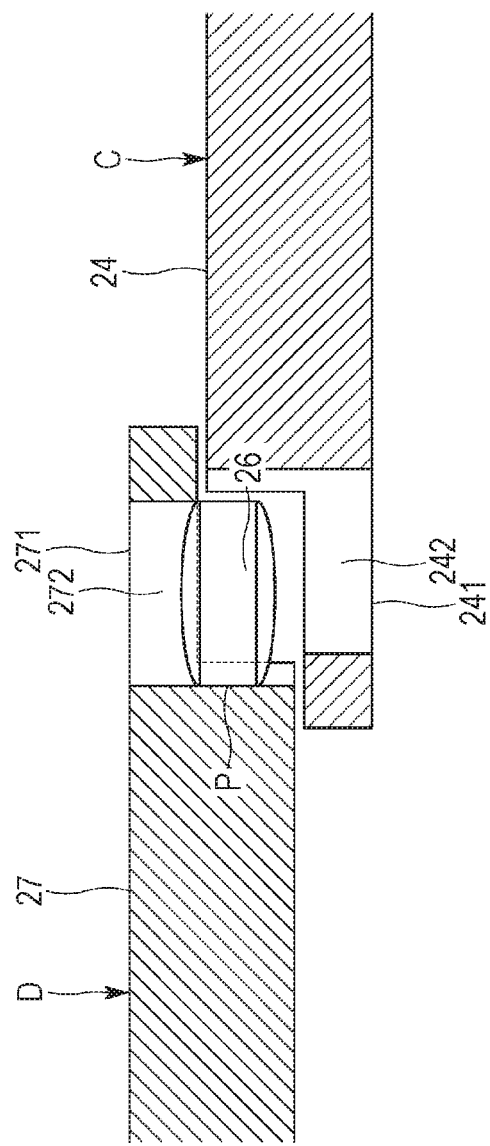
FIG. 15 is a longitudinal sectional view showing a main part of the conveying mechanism according to the exemplary embodiment.

As shown exemplarily in FIG. 15, the lower surface of the flange 271 in an outer circumferential portion of the rotator 27 in the conveying mechanism D1 is positioned above the upper surface of flange 241 in the outer circumferential portion of the rotator 24 of the conveying mechanism C1 in the module C. The flange 271 of the rotator 27 partially overlaps the flange 241 of the rotator 24 from above. Synchronous rotation between the rotator 24 and the rotator 27 causes each of the recessed bores 242 and a corresponding one of the recessed bores 272 to temporarily overlap each other at the end position 26.

At the end position 26, the molded product P engaged in the recessed bore 242 of the rotator 24 and being transferred shifts from on the flange 241 to vertically below the flange 271 of the rotator 27 due to a rotation of the rotator 24. The molded product P is captured in the recessed bore 272 in the rotator 27 and enters the recessed bore 272 to be engaged therein. The molded products P are each accommodated in one of the recessed bores 272. The recessed bores 272 thus engage with the molded products P one by one in the order of alignment of the recessed bores 242 in the rotator 24 of the conveying mechanism C1 (i.e., keeping the order of compression molding by the molding machine A). The molded products P will not be reversed vertically while being delivered from the rotator 24 of the conveying mechanism C1 to the rotator 27 of the conveying mechanism D1.

Each of the molded product P captured in the recessed bore 272 is retained adjacent to the flange 271 of the rotator 27. The molded products are transferred along a rotation locus of the recessed bores 272 due to rotation of the rotator 27. Each of the molded products P accommodated in the recessed bore 272 is substantially constantly positioned relatively to the rotator 27 and the recessed bore 272. The molded product P receives a centrifugal force due to a rotation of the rotator 27, but engages in the recessed bore 272 so as not to be displaced outward. Furthermore, the molded products P will not be reversed vertically in the transfer process.

The molded products P can alternatively be sucked to the rotator 27 by negative pressure generated through sucking air in the recessed bores 272.

Figure 16:
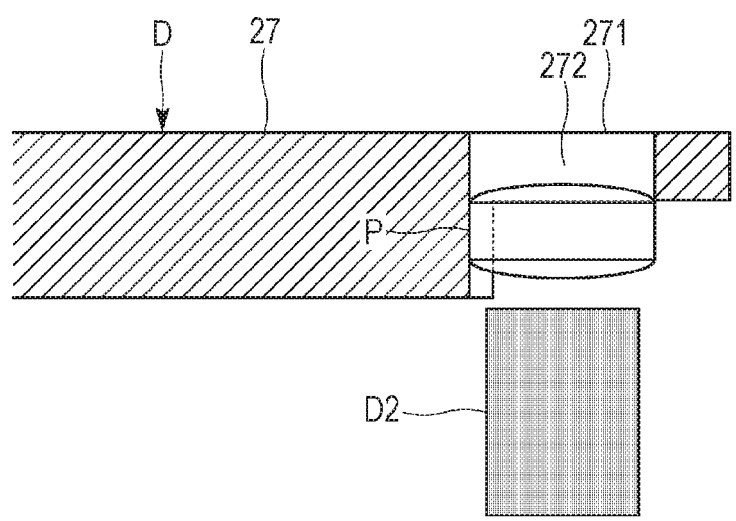
FIG. 16 is a longitudinal sectional view showing main parts of the conveying mechanism and the processing mechanism according to the exemplary embodiment.

As shown exemplarily in FIGS. 11 and 16, the rotator 27 has a predetermined area in the outer circumferential portion, equipped with an exterior inspection mechanism D2 including a camera, as one of the processing mechanisms in the module D. The camera in the exterior inspection mechanism D2 is configured to image a predetermined surface like the lower surface of each of the molded products P captured in the recessed bore 272 and transferred, to obtain a picture thereof. The obtained picture can be used for an inspection of the exterior condition of the molded product P. Specifically, the obtained picture can be analyzed, be compared with a picture of a normal molded product P, or the like to enable determination of whether the exterior of the molded product P is in a normal or a defective condition.

The die table 31 of the molding machine A, the rotator 17 of the conveying mechanism B1 in the module B, the rotator 24 of the conveying mechanism C1 in the module C, and the rotator 27 of the conveying mechanism in the module D rotate in synchronization with one another. The controller 0 refers to a signal outputted from an angular position sensor (e.g., a rotary encoder) attached to the turret 3 of the molding machine A, the rotator 17 of the conveying mechanism B1, the rotator 24 of the conveying mechanism C1, or the rotator 27 of the conveying mechanism D1 to find current positions of the recessed bores 272 aligned circumferentially around the rotary axis of the rotator 27. Furthermore, it is possible to find a current position in the module D, of the molded product P compression molded in the die bore 4 having a certain order number in the die table 31 of the molding machine A. This indicates that the molded product P having passed in front of the camera of the exterior inspection mechanism D2 or having gone through an exterior inspection is molded in the die bore 4 having a certain order number. The controller 0 stores to hold in the storage device, information on a result of the exterior inspection of the molded product P (a result of determination of whether the exterior of the target molded product P is in a normal or a defective condition) with use of the exterior inspection mechanism D2, in association with an ID number indicating a certain order number of the die bore 4 used for molding the target molded product P.

The molded product P captured in the recessed bore 272 of the rotator 27 is transferred to a transfer end position 29. There is, however, a demand for removal or collection of specific one of the molded products P such as a defective product or a sampled product by selecting from among the molded products P to be transferred to the end position 29.

Figure 17:
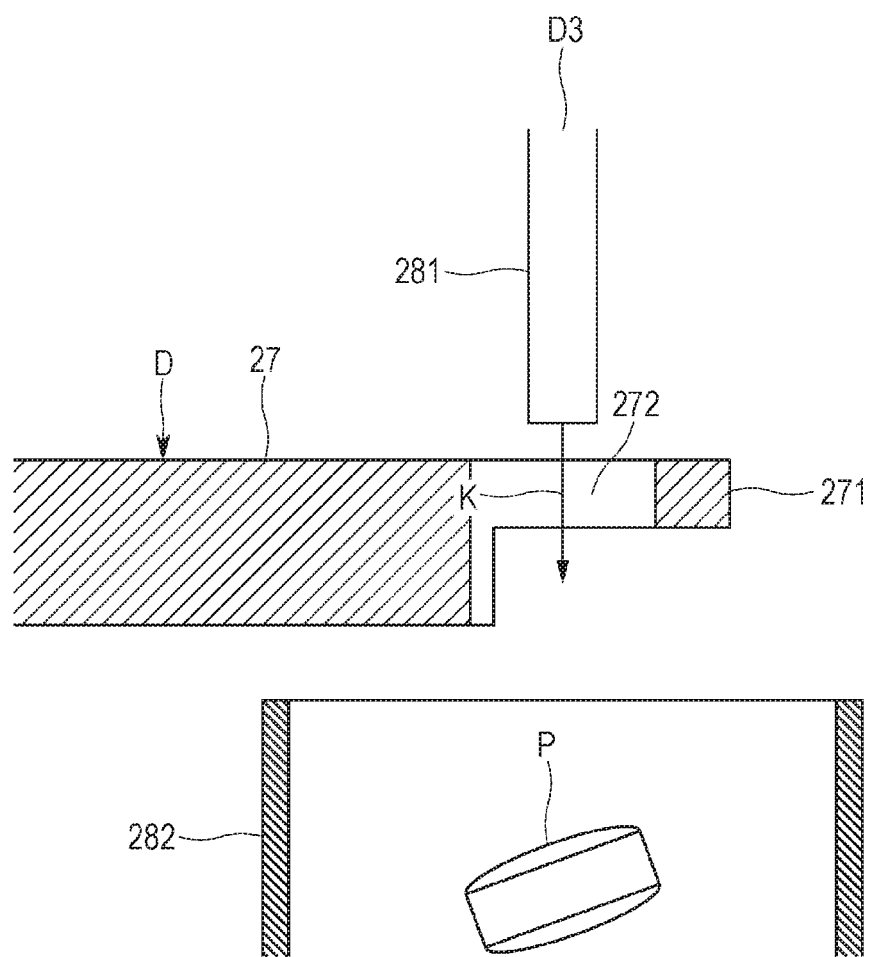
FIG. 17 is a longitudinal sectional view showing main parts of the conveying mechanism and a removal mechanism according to the exemplary embodiment.

As shown exemplarily in FIGS. 11 and 17, there is equipped a removal mechanism D3 configured to remove specific one of the molded products P halfway on the rotation locus of the recessed bore 272 and the molded product P to the end position 29 in the conveying mechanism D1 in the module D. The removal mechanism D3 includes, as constituent elements, a spray nozzle 281 configured to spray the compressed air K toward the molded product P engaged in the recessed bore 272 of the rotator 27, and a chute 282 configured to receive the molded product P dropping by being blown off by the compressed air K. The spray nozzle 281 and the chute 282 are disposed to vertically face each other with the molded product P interposed therebetween. The spray nozzle 281 sprays the compressed air K to remove the molded product P retained in the recessed bore 272, and the chute 282 receives to collect the molded product P dropping from the flange 271 of the rotator 27.

The recessed bore 272 capturing the molded product P vertically penetrates the flange 271 of the rotator 27, and the spray nozzle 281 is positioned vertically above the flange 271 whereas the chute 282 is positioned vertically below the flange 271. The spray nozzle 281 has a distal end extending to be adjacent to an upper surface of the flange 271. The compressed air K sprayed downward from the spray nozzle 281 passes through the recessed bore 272 and hits the molded product P to detach the molded product P from the flange 271. The compressed air K can have small injection quantity (a flow rate per unit time) and small injection pressure. The spray nozzle 281 has a relative position to the rotator 27 and a direction of spraying the compressed air K, which are set appropriately to allow the molded products P to be detached from the flange 271.

The controller 0 identifies that the die bore 4 having a certain order number in the molding machine A is used for molding the molded product P engaged in each of the recessed bores 272 of the rotator 27. The controller 0 stores, for each of the molded products P, information on results of various inspection of the molded product P in the molding machine A and the modules B, C, and D of the processing system S, namely, whether compression pressure for compression molding is normal or defective, whether the exterior of the molded product P is normal or defective, whether or not the molded product P contains any foreign matter, and the like, in association with an ID number indicating a certain order number of the die bore 4 used for molding the molded product P in the molding machine A. The controller 0 accordingly recognizes whether the molded product P engaged in each of the recessed bores 272 of the rotator 27 is normal or defective, and can find a current position of the recessed bore 272 engaged with a defective molded product P.

The controller 0 transmits a control signal for opening a valve configured to control the flow of the compressed air K (possibly incorporated in the spray nozzle 281) when the recessed bore 272 capturing the defective molded product P passes near the spray nozzle 281, to cause the spray nozzle 281 to spray the compressed air K toward the defective molded product P to drop and to remove the molded product P from the rotator 27. The molded product P dropping onto the chute 282 cannot reach the end position 29.

The normal molded products P not removed by the removal mechanism D3 reach the end position 29 of transfer by the conveying mechanism D1. Each of the molded products P leaves the recessed bore 272 of the rotator 27 at the end position 29, to be delivered to a device or an equipment configured to apply a subsequent process to the molded product P or drop into a container or the like collecting the molded product P.

The molded product P engaged in the recessed bore 272 is conveyed in a rotation direction of the rotator 27 while being constantly positioned relatively to the rotator 27 and the recessed bore 272. This is effectual for processing of an exterior inspection through imaging the molded product P with use of the camera D2, processing of spraying the compressed air K toward the molded product P engaged in specific one of the recessed bores 272 to remove or to extract the molded product, and the like.

The processing mechanisms included in the modules B, C, and D of the processing system S are obviously not limited to those exemplified above. Specific examples of the processing mechanisms include a quality inspection mechanism configured to inspect each of the molded products P in terms of volume, weight, or components to determine normality or defectiveness of the molded product P, particularly configured to analyze the components, segregation, or the like of the molded product P in accordance with Raman spectroscopy, near infrared reflectance (NIR, or a near infrared absorption spectrum method), X-ray diffraction, X-ray transmission measurement, high performance liquid chromatography (HPLC), or the like to determine normality or defectiveness of the molded product P, a foreign matter detection mechanism as a metal detector configured to inspect the molded product P as to whether or not any alien metal is contained, a printing mechanism as a laser beam machine configured to irradiate the molded product P with laser beams to engrave or to apply laser marking on the exterior of the molded product P, a printing mechanism as an ink jet printer configured to apply ink jet printing to a surface of the molded product P, a wrapping mechanism configured to wrap the molded product P in a press through pack (PTP) sheet, an easy seal open pack (ESOP) sheet, or the like, and a wrapping mechanism configured to fill the molded product P in a container such as a bottle to wrap the molded product P.

Each of these processing mechanisms is also accommodated in a containment case and processes the molded product P in the containment case. The information on the result of an inspection of each of the molded products P with use of the quality inspection mechanism or the foreign matter detection mechanism is stored in the storage device of the controller 0 in association with the identification information on the die bore 4 and the pair of upper and lower punches 5 and 6 used for molding the molded product P. The molded product P determined as being defective can be removed by the removal mechanism D3.

As schematically shown exemplarily in FIGS. 2 and 11, the molding machine A is accommodated in a containment case E1. The modules B, C, and D in the processing system S are also accommodated in containment cases E2 and E3.

The containment case E1 for the molding machine A and the containment case E2 for the module B, directly connected thereto, are connected via a joint J. This joint J is configured to allow communication between an internal space of the containment case E1 accommodating the molding machine A and an internal space of the containment case E2 accommodating the module B, and to appropriately attach and detach the former containment case E1 to and from the latter containment case E2. This leads to appropriate attachment and detachment between the molding machine A and the module B. The joint J accommodates the molded product discharge position 16, where the die table 31 of the molding machine A and the rotator 17 of the conveying mechanism B1 in the module B overlap each other in a planar view, as well as a peripheral area thereof.

The containment case E2 for the module B and the containment case E3 for the modules C and D, directly connected thereto, are also connected via another joint J. The joint J is configured to allow communication between the internal space of the containment case E2 accommodating the module B and an internal space of the containment case E3 accommodating the modules C and D, and appropriately attach and detach the former containment case E2 to and from the latter containment case E3. This leads to appropriate attachment and detachment between the module B and the module C. The joint J accommodates the end position 23, where the rotator 17 of the conveying mechanism B1 in the module B and the rotator 24 of the conveying mechanism C1 in the module C overlap each other in a planar view, as well as a peripheral area thereof.

The containment cases E1, E2, and E3 and the joints J inhibit unintended leakage of atmospheres in the internal spaces around the molding machine A and the modules B, C, and D to outside the containment cases E1, E2, and E3. Molding of the molded products P, delivery of the molded products P between the molding machine A and the module B as well as between the modules B, C, and D, and application of post processes to the molded products P such as the removal of dust adhering to the molded products P and inspection of the molded products P, are each executed in appropriate one of the containment cases E1, E2, and E3. Execution of such post processes does not require the molded products P to be discharged out of the system.

The joints J attached to the containment cases E1, E2, and E3 accommodating the molding machine A and the modules B, C, and D are commonly applicable to the containment cases E1, E2, and E3. The joint J attached to any one of the containment cases E1, E2, and E3 can thus be connected to the joint J attached to another one of the containment cases E1, E2, and E3. That is, any one of the modules B, C, and D can be located downstream of and directly connected to the molding machine A. For example, the joint J at the containment case E1 for the molding machine A can be connected with the joint J at the containment case E3 for the module C so as to allow the module C to be located downstream of and directly connected to the molding machine A. The joint J at the containment case E3 for the module D can be connected with a joint at a containment case for another module for addition of the module disposed downstream of the module D. The module B is preferred to be disposed downstream of and connected next to the molding machine A.

The joint J not used for connection between the containment cases E1, E2, and E3 can be closed to prevent an external leakage of the atmospheres in the containment cases E1, E2, and E3.

The module B and the modules C and D are exemplarily accommodated in the separate containment cases E2 and E3, respectively. The exemplary invention is also applicable to a case where the modules B, C, and D are accommodated in a single containment case. The module C and the module D can alternatively be accommodated in containment cases separately from each other. The exemplary invention is also applicable to a case where the molding machine A and at least one of the modules B, C, and D connected thereto are accommodated in a single containment case.

The module B, C, or D including the conveying mechanism B1, C1, or D1 and an appropriate processing mechanism can be accommodated in the containment case E2 or E3, and appropriate one of the modules B, C, and D can be located downstream of and connected to the molding machine A via the joint J at the containment case E2 or E3. Application of any appropriate post process to the molded products P by the molding machine A can be set through selection of one of the modules B, C, and D located downstream of and connected to the molding machine A. The number of the modules B, C, and D located downstream of and connected to the molding machine A and the number of the containment cases E2 and E3 located downstream of and connected via the joint J to the containment case E1 are not limited to the above exemplification.

The exemplary embodiment provides a processing system S configured to apply a post process to a molded product P molded by a molding machine A that includes a die table 31 having a vertically penetrating die bore 4, and an upper punch 5 and a lower punch 6 vertically slidably retained above and below the die bore 4, and is configured to compress a powdery material filled in the die bore 4 with use of the upper punch 5 and the lower punch 6 to mold the molded product P.

The processing system S includes modules B, C, and D each including a conveying mechanism B1, C1, or D1 configured to convey a plurality of molded products P kept aligned in an order of molding by the molding machine A, and a processing mechanism B2, B3, C2, C3, or D2 confronting a travel route of the molded products P conveyed by the conveying mechanism B1, C1, or D1 and configured to apply a predetermined post process to each of the conveyed molded products P, in which upstream one of the modules B and C and downstream one of the modules C and D are connected to allow the molded products P having gone through certain processing at the upstream one of the modules B and C to sequentially be delivered to the downstream one of the modules C and D and be subjected to a different predetermined processing at the one of the modules C and D.

The exemplary embodiment achieves application of an appropriate post process to the molded products P by addition or removal of a module including an appropriate processing mechanism.

Each of the modules B, C, and D is accommodated in a containment case E2 or E3 inhibiting an external leakage of an atmosphere in the containment case E2 or E3, and applies the post process to the molded products P in the containment case E2 or E3. The system achieves a containment environment with neither halfway discharge of the molded product from the system nor the external leakage of any atmosphere including the powdery material. The system is particularly useful for production of molded products P containing a highly pharmacologically active substance. The system also inhibits contamination of the molded products P.

The conveying mechanism B1, C1, or D1 included in the module B, C, or D substantially horizontally shifts the plurality of molded products P being kept aligned. This inhibits as much as possible a vertical positional displacement of the molded products P to reduce a risk of damage to the molded products P dropped due to gravity force. Furthermore, this does not essentially require any lift configured to lift upward the molded products P.

The compression-molding machine A includes a plurality of die bores 4, and a plurality of pairs of upper punches 5 and lower punches 6, the processing mechanism B2, B3, C2, C3, or D2 included in the module B, C, or D corresponds to an exterior inspection mechanism B3, C3, or D2 that includes a camera configured to image each of the molded products P, and is configured to inspect the molded product P in terms of an exterior condition, a quality inspection mechanism configured to inspect the molded product P in terms of volume, weight, or a component, or a foreign matter detection mechanism C2 configured to inspect the molded product as to whether or not the molded product P contains any foreign matter, and a controller 0 includes a storage device configured to store information on a result of an inspection of the molded product P by the processing mechanism B3, C2, C3, or D2, in association with identification information on the die bore 4 and the pair of upper and lower punches 5 and 6 used for molding the molded product P. The molded product P found to have defectiveness through inspection can thus be specified and tracked. It is also possible to quickly specify the die bore 4 and the pair of punches 5 and 6 causing defectiveness of the molded product P in the molding machine A, so that a mold, namely, the die bore 4 or the punch 5 or 6 causing the defectiveness of the molded product P can be replaced to readily solve the defectiveness in the production of the molded products P.

The module D includes a removal mechanism D3 configured to select to remove the molded product P determined as being defective through inspection by the processing mechanism B3, C2, C3, or D2, from the normal molded products. The system enables removal of only the defective molded product P without stopping the molding machine A or the processing system S to achieve improvement in yield of the molded products P.

The exemplary invention is not limited to the exemplary embodiment detailed above. The conveying mechanisms B1, C1, and D1 according to the above exemplary embodiment are each configured to transfer the molded products P along the horizontal rotation locus. There can alternatively be incorporated a conveying mechanism configured to transfer the molded products P along a linear locus, and the processing mechanism B2, B3, C2, C3, or D2 can be equipped to the conveying mechanism.

The molded product P can alternatively be arrayed in a plurality of lines instead of being aligned in a single line while being conveyed by the conveying mechanism.

The modules B, C, and D in the processing system S according to the above exemplary embodiment are connected to the molding machine A to allow the molded products P molded by the molding machine A to be discharged directly from the molding machine A and be directly subjected to the post processes. The modules B, C, and D in the processing system S can alternatively not be connected with the molding machine A so as to be independent from the molding machine A, and the molded products P can be reserved after being molded by the molding machine A and then be fed to the module B disposed uppermost stream to be subjected to the post process.

The processing system S not necessarily accompanies the molding machine A, but can alternatively accompany an exemplary device configured to coat the molded products P. The modules B, C, and D in the processing system S are not limited to three in terms of the number.

The controller 0 can control to stop the molding machine A upon detection of defectiveness of the molded product P by the exterior inspection mechanism B3, C3, or D2, the quality inspection mechanism, the foreign matter detection mechanism C2, or the like.

Moreover, the specific configuration of each portion can be modified in various manners within the range not departing from the purpose of the exemplary invention.

The descriptions of the various exemplary embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A molded product processing system configured to apply a post process to a molded product molded by a compression-molding machine that includes a die table including a vertically penetrating die bore, and an upper punch and a lower punch vertically slidably retained above and below the die bore, respectively, the compression-molding machine being configured to compress a powdery material filled in the die bore by the upper punch and the lower punch to mold the molded product, the molded product processing system comprising:

modules each including:
a conveying mechanism configured to convey a plurality of molded products kept aligned in an order of molding by the compression-molding machine; and
a processing mechanism confronting a travel route of the molded products conveyed by the conveying mechanism and configured to apply a predetermined post process to each of the conveyed molded products,
wherein an upstream one of the modules and a downstream one of the modules are connected to allow the molded products having gone through certain processing at the upstream one of the modules to sequentially be delivered to the downstream one of the modules and to be subjected to a different predetermined processing at one of the modules.

2. The molded product processing system according to claim 1, wherein each of the modules is accommodated in a containment case inhibiting an external leakage of an atmosphere in the containment case, and applies the post process to the molded products in the containment case.

3. The molded product processing system according to claim 1, wherein the conveying mechanism, included in the each module substantially horizontally, shifts the plurality of molded products being kept aligned.

4. The molded product processing system according to claim 1, wherein the processing mechanism, included in the each module, corresponds to at least one of an exterior inspection mechanism that includes a camera and is configured to image each of the molded products, and further is configured to inspect the molded product in terms of an exterior condition, a dust removal mechanism configured to remove dust adhering to the molded product, a quality inspection mechanism configured to inspect the molded product in terms of volume, weight, or a component, a foreign matter detection mechanism configured to inspect the molded product as to whether or not the molded product contains a foreign matter, a printing mechanism configured to print or to engrave on the exterior of the molded product, or a wrapping mechanism configured to wrap the molded product.

5. The molded product processing system according to claim 1, wherein the die bore of the compression-molding machine includes a plurality of die bores, and the upper punch and the lower punch comprise a plurality of pairs of upper punches and lower punches,
wherein the processing mechanism included in the each module corresponds to an exterior inspection mechanism that includes a camera configured to image each of the molded products, and further is configured to inspect the molded product in terms of an exterior condition, a quality inspection mechanism configured to inspect the molded product in terms of volume, weight, or a component, or a foreign matter detection mechanism configured to inspect the molded product as to whether or not the molded product contains a foreign matter, and
wherein a controller includes a storage device configured to store information on a result of an inspection of the molded product by the processing mechanism in association with identification information on the die bore and the pair of upper and lower punches used for molding the molded product.

6. The molded product processing system according to claim 5, wherein the each module includes a removal mechanism configured selectively to remove the molded product determined as being defective through an inspection by the processing mechanism from normal molded products.

7. The molded product processing system according to claim 2, wherein the conveying mechanism, included in the each module substantially horizontally, shifts the plurality of molded products being kept aligned.

8. The molded product processing system according to claim 2, wherein the processing mechanism, included in the each module, corresponds to at least one of an exterior inspection mechanism that includes a camera and is configured to image each of the molded products, and further is configured to inspect the molded product in terms of an exterior condition, a dust removal mechanism configured to remove dust adhering to the molded product, a quality inspection mechanism configured to inspect the molded product in terms of volume, weight, or a component, a foreign matter detection mechanism configured to inspect the molded product as to whether or not the molded product contains a foreign matter, a printing mechanism configured to print or to engrave on the exterior of the molded product, or a wrapping mechanism configured to wrap the molded product.

9. The molded product processing system according to claim 2, wherein the die bore of the compression-molding machine includes a plurality of die bores, and the upper punch and the lower punch comprise a plurality of pairs of upper punches and lower punches,
wherein the processing mechanism included in the each module corresponds to an exterior inspection mechanism that includes a camera configured to image each of the molded products, and further is configured to inspect the molded product in terms of an exterior condition, a quality inspection mechanism configured to inspect the molded product in terms of volume, weight, or a component, or a foreign matter detection mechanism configured to inspect the molded product as to whether or not the molded product contains a foreign matter, and
wherein a controller includes a storage device configured to store information on a result of an inspection of the molded product by the processing mechanism in association with identification information on the die bore and the pair of upper and lower punches used for molding the molded product.

10. The molded product processing system according to claim 3, wherein the processing mechanism, included in the each module, corresponds to at least one of an exterior inspection mechanism that includes a camera and is configured to image each of the molded products, and configured to inspect the molded product in terms of an exterior condition, a dust removal mechanism configured to remove dust adhering to the molded product, a quality inspection mechanism configured to inspect the molded product in terms of volume, weight, or a component, a foreign matter detection mechanism configured to inspect the molded product as to whether or not the molded product contains a foreign matter, a printing mechanism configured to print or to engrave on the exterior of the molded product, or a wrapping mechanism configured to wrap the molded product.

11. The molded product processing system according to claim 3, wherein the die bore of the compression-molding machine includes a plurality of die bores, and the upper punch and the lower punch comprise a plurality of pairs of upper punches and lower punches,
wherein the processing mechanism included in the each module corresponds to an exterior inspection mechanism that includes a camera configured to image each of the molded products, and further is configured to inspect the molded product in terms of an exterior condition, a quality inspection mechanism configured to inspect the molded product in terms of volume, weight, or a component, or a foreign matter detection mechanism configured to inspect the molded product as to whether or not the molded product contains a foreign matter, and
wherein a controller includes a storage device configured to store information on a result of an inspection of the molded product by the processing mechanism in association with identification information on the die bore and the pair of upper and lower punches used for molding the molded product.

12. The molded product processing system according to claim 4, wherein the die bore of the compression-molding machine includes a plurality of die bores, and the upper punch and the lower punch comprise a plurality of pairs of upper punches and lower punches,
wherein the processing mechanism included in the each module corresponds to an exterior inspection mechanism that includes a camera configured to image each of the molded products, and further is configured to inspect the molded product in terms of an exterior condition, a quality inspection mechanism configured to inspect the molded product in terms of volume, weight, or a component, or a foreign matter detection mechanism configured to inspect the molded product as to whether or not the molded product contains a foreign matter, and wherein a controller includes a storage device configured to store information on a result of an inspection of the molded product by the processing mechanism in association with identification information on the die bore and the pair of upper and lower punches used for molding the molded product.

13. The molded product processing system according to claim 9, wherein the each module includes a removal mechanism configured selectively to remove the molded product determined as being defective through an inspection by the processing mechanism from normal molded products.

14. The molded product processing system according to claim 11, wherein the each module includes a removal mechanism configured selectively to remove the molded product determined as being defective through an inspection by the processing mechanism from normal molded products.

15. The molded product processing system according to claim 12, wherein the each module includes a removal mechanism configured selectively to remove the molded product determined as being defective through an inspection by the processing mechanism from normal molded products.

16. A molding system, comprising:
a compression-molding machine, comprising:
a die table including a die bore; and
an upper punch and a lower punch vertically slidably retained above and below the die bore, respectively, the compression-molding machine being configured to compress a powdery material filled in the die bore by the upper punch and the lower punch to mold a molded product; and
a molded product processing system configured to apply a post process to the molded product molded by the compression-molding machine, the molded product processing system comprising modules, each including:
a conveying mechanism configured to convey a plurality of molded products kept aligned in an order of molding by the compression-molding machine; and
a processing mechanism confronting a travel route of the molded products conveyed by the conveying mechanism and configured to apply a predetermined post process to each of the conveyed molded products,
wherein an upstream one of the modules and a downstream one of the modules are connected to allow the molded products having gone through certain processing at the upstream one of the modules to sequentially be delivered to the downstream one of the modules and to be subjected to a different predetermined processing at one of the modules.

17. The molding system according to claim 16, wherein each of the modules is accommodated in a containment case inhibiting an external leakage of an atmosphere in the containment case, and applies the post process to the molded products in the containment case.

18. The molding system according to claim 16, wherein the conveying mechanism, included in the each module substantially horizontally, shifts the plurality of molded products being kept aligned.

19. The molding system according to claim 16, wherein the processing mechanism, included in the each module, corresponds to at least one of an exterior inspection mechanism that includes a camera and is configured to image each of the molded products, and further is configured to inspect the molded product in terms of an exterior condition, a dust removal mechanism configured to remove dust adhering to the molded product, a quality inspection mechanism configured to inspect the molded product in terms of volume, weight, or a component, a foreign matter detection mechanism configured to inspect the molded product as to whether or not the molded product contains a foreign matter, a printing mechanism configured to print or to engrave on the exterior of the molded product, or a wrapping mechanism configured to wrap the molded product.

20. The molding system according to claim 16, wherein the processing mechanism, included in the each module, corresponds to an exterior inspection mechanism that includes a camera and is configured to image each of the molded products.

* * * * *